United States Patent
Ohno et al.

(10) Patent No.: US 10,399,182 B2
(45) Date of Patent: Sep. 3, 2019

(54) OPTICAL PROCESSING APPARATUS AND SHAPING APPARATUS

(71) Applicant: TECHNOLOGY RESEARCH ASSOCIATION FOR FUTURE ADDITIVE MANUFACTURING, Tokyo (JP)

(72) Inventors: Hiroshi Ohno, Kanagawa (JP); Yuji Sasaki, Kanagawa (JP); Satoshi Tsuno, Kanagawa (JP); Naotada Okada, Kanagawa (JP); Mitsuo Sasaki, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 284 days.

(21) Appl. No.: 15/123,889

(22) PCT Filed: Mar. 15, 2016

(86) PCT No.: PCT/JP2016/058204
§ 371 (c)(1),
(2) Date: Sep. 6, 2016

(87) PCT Pub. No.: WO2017/158739
PCT Pub. Date: Sep. 21, 2017

(65) Prior Publication Data
US 2018/0161932 A1    Jun. 14, 2018

(51) Int. Cl.
*B23K 26/342* (2014.01)
*B23K 26/082* (2014.01)
(Continued)

(52) U.S. Cl.
CPC ........ *B23K 26/342* (2015.10); *B23K 26/0643* (2013.01); *B23K 26/0665* (2013.01);
(Continued)

(58) Field of Classification Search
USPC .......................... 219/121.25–29, 0.73–8, 0.6
See application file for complete search history.

(56) References Cited

U.S. PATENT DOCUMENTS

| 5,637,244 A | * | 6/1997 | Erokhin | .................. B41M 5/26 |
| | | | | 219/121.69 |
| 6,392,192 B1 | | 5/2002 | Cole, III et al. | |

(Continued)

FOREIGN PATENT DOCUMENTS

| CN | 104625423 A | 5/2015 |
| DE | 39 39 866 A1 | 6/1991 |

(Continued)

OTHER PUBLICATIONS

International Search Report (ISR) dated Jun. 21, 2016 for International Application No. PCT/JP2016/058204.

(Continued)

*Primary Examiner* — Dana Ross
*Assistant Examiner* — Michael S. Poetzinger
(74) *Attorney, Agent, or Firm* — Ladas & Parry LLP

(57) ABSTRACT

The mobility of an optical processing apparatus is improved. There is provided an optical processing apparatus for scanning a processing region having an at least one-dimensional spread by moving a nozzle head while irradiating the processing region with an optical processing light beam via the nozzle head, including a light source that emits, to air, the optical processing light beam toward the nozzle head, a nozzle head that includes a hollow nozzle in a vertical direction and a light beam direction changing optical system which receives the light beam emitted from the light source (Continued)

and propagated in the air, and changes a propagation direction of the received light beam to a direction of a currently processed processing point in the processing region, and a main scanning direction moving mechanism that moves the nozzle head by causing the nozzle head to scan in a main scanning direction of the processing region.

17 Claims, 13 Drawing Sheets

(51) Int. Cl.
 B22F 3/105 (2006.01)
 B23K 26/067 (2006.01)
 B33Y 30/00 (2015.01)
 B29C 67/00 (2017.01)
 B29C 64/153 (2017.01)
 B23K 26/06 (2014.01)
 B23K 26/14 (2014.01)
 B23K 26/08 (2014.01)
 B22F 3/16 (2006.01)

(52) U.S. Cl.
 CPC ........ *B23K 26/0673* (2013.01); *B23K 26/082* (2015.10); *B23K 26/0876* (2013.01); *B23K 26/147* (2013.01); *B29C 64/153* (2017.08); *B29C 67/00* (2013.01); *B33Y 30/00* (2014.12); *B22F 3/105* (2013.01); *B22F 3/16* (2013.01)

(56) References Cited

U.S. PATENT DOCUMENTS

| | | | |
|---|---|---|---|
| 6,420,674 B1 | 7/2002 | Cole, III et al. | |
| 6,462,301 B1 | 10/2002 | Scott et al. | |
| 7,223,935 B2 | 5/2007 | Wessner | |
| 8,404,999 B2* | 3/2013 | Togashi | B23K 26/0673 219/121.67 |
| 9,352,420 B2* | 5/2016 | Whitfield | B23K 26/34 |
| 2007/0164005 A1 | 7/2007 | Matsuda et al. | |
| 2007/0181544 A1 | 8/2007 | Sukhman et al. | |
| 2012/0145683 A1 | 6/2012 | Miyagi et al. | |
| 2014/0069893 A1 | 3/2014 | Bruck et al. | |
| 2017/0326684 A1 | 11/2017 | Ju et al. | |

FOREIGN PATENT DOCUMENTS

| | | |
|---|---|---|
| DE | 10 2005 016 734 A1 | 10/2006 |
| EP | 0 159 723 A2 | 10/1985 |
| EP | 0 997 222 A1 | 5/2000 |
| GB | 2 354 845 A | 4/2001 |
| JP | 3-138092 A | 6/1991 |
| JP | 6-198480 A | 7/1994 |
| JP | 8-252685 A | 10/1996 |
| JP | 2003-528727 A | 9/2003 |
| JP | 2007-190560 A | 8/2007 |
| JP | 2012-125772 A | 7/2012 |
| JP | 2015-535745 A | 12/2015 |
| WO | 99/59758 A2 | 11/1999 |
| WO | 2014/042938 A1 | 3/2014 |

OTHER PUBLICATIONS

Written Opinion (WO) dated Jun. 21, 2016 for International Application No. PCT/JP2016/058204.
J-PlatPat English abstract of JP 6-198480 A.
J-PlatPat English abstract of JP 8-252685 A.
J-PlatPat English abstract of JP 3-138092 A.
J-PlatPat English abstract of JP 2007-190560 A.
J-PlatPat English abstract of JP 2012-125772 A.
Supplementary European Search Report (SESR) dated Apr. 4, 2018 in connection with corresponding European Patent Application No. 16 823 141.3.
Espacenet English abstract of DE 10 2005 016 734 A1.
Espacenet English abstract of DE 39 39 866 A1.

* cited by examiner

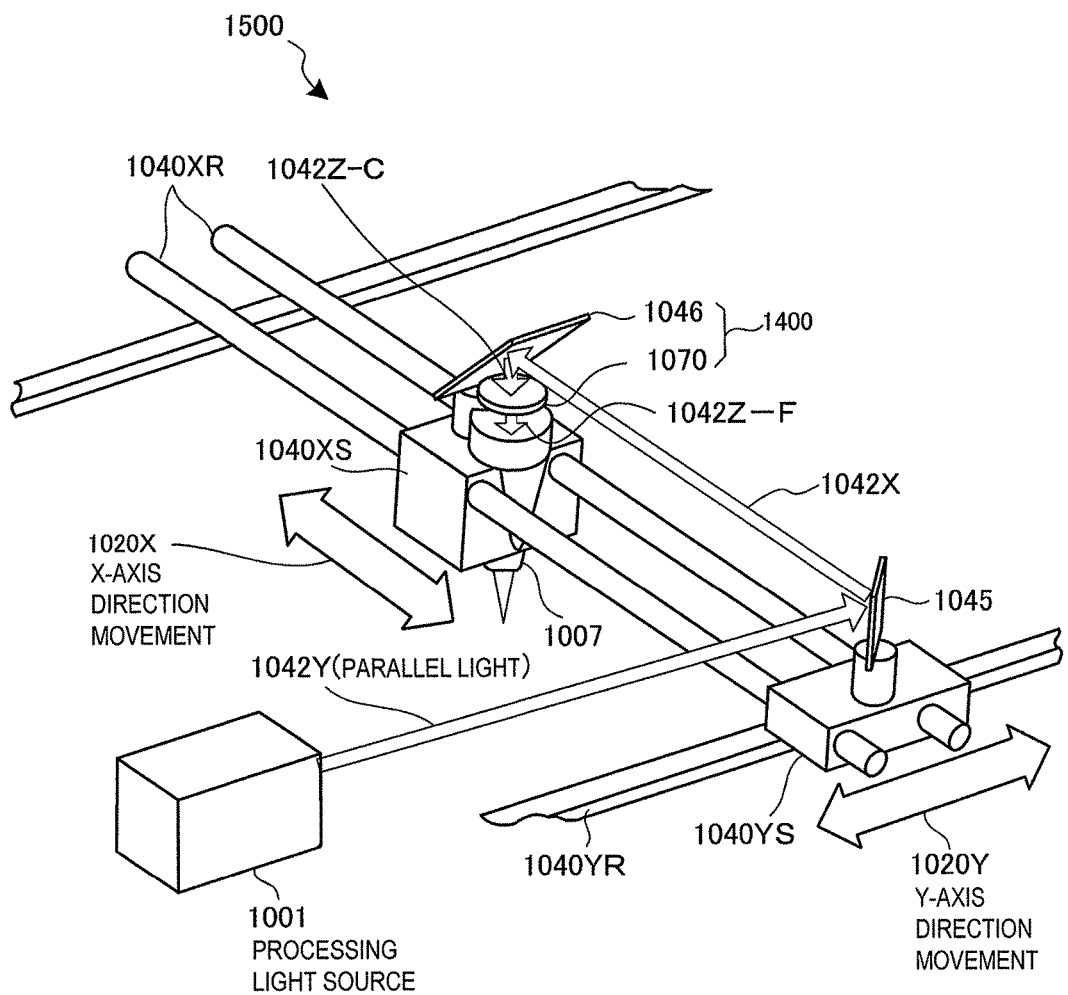
F I G. 2

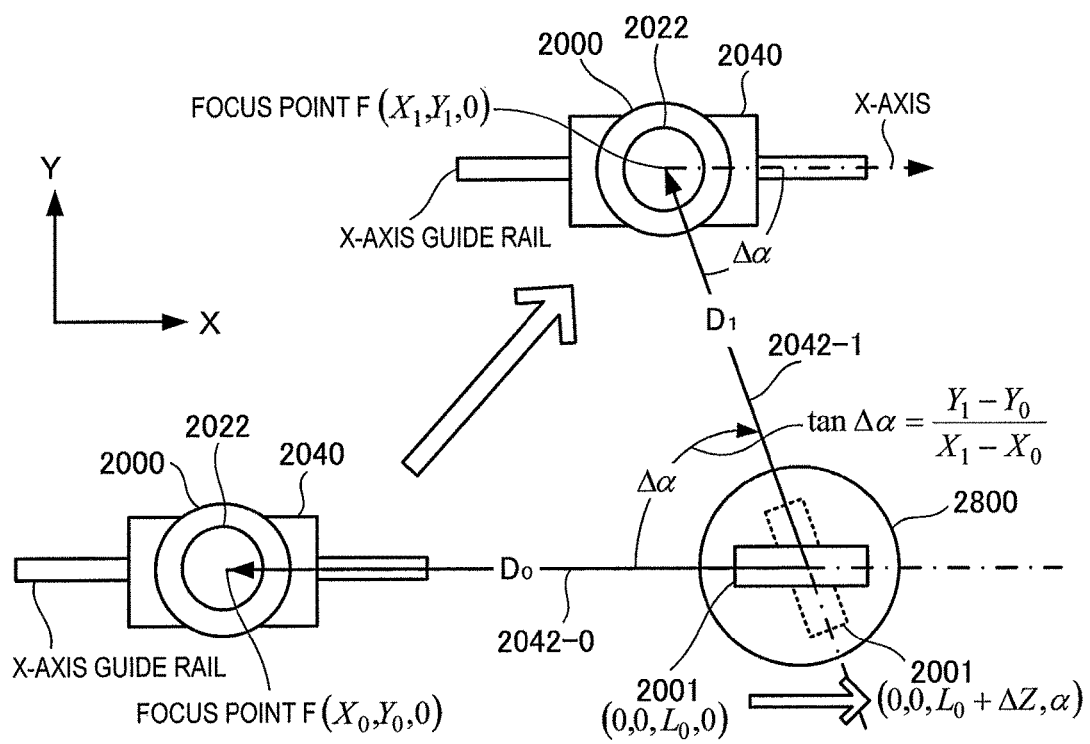
F I G. 11

OPTICAL PROCESSING APPARATUS AND SHAPING APPARATUS

RELATED APPLICATION

This application is an application under 35 U.S.C. 371 of International Application No. PCT/JP2016/058204 filed on Mar. 15, 2016, the entire contents of which are incorporated herein by reference.

TECHNICAL FIELD

The present invention relates to an optical processing apparatus used for optical processing of melting a powder material and performing shaping by irradiating a process surface with light such as a laser beam, and ejecting, for example, a fluid containing the powder material to the irradiated portion and, more particularly, to improvement of the mobility of movement and processing accuracy of the processing head (optical processing head or nozzle head) or nozzle of the optical processing apparatus.

BACKGROUND ART

In the above technical field, patent literature 1 discloses a processing head in which a powder ejector that ejects a powder material to a processing point and a condensing optical system that condenses the energy of processing light are integrated.

CITATION LIST

Patent Literature

Patent literature 1: U.S. Pat. No. 7,223,935

SUMMARY OF THE INVENTION

Technical Problem

In the conventional structure, a nozzle (or nozzle head) serving as a powder ejector and a condensing optical system are integrated. Thus, the optical processing head is heavy and the mobility when moving the optical processing head is low.

Especially, a light source of processing light such as a laser beam is heavy, and has low mobility. Therefore, it is difficult to move the light source together with the optical processing head. To cope with this, in the conventional arrangement, the light source is fixed, and the light source and the optical processing head are connected by an optical fiber, thereby moving the optical processing head.

Furthermore, the optical fiber is thin and is not heavy. However, the weight and volume increase by including a sheath for protecting the optical fiber, and the fiber that moves together with the optical processing head may interfere with another device. Consequently, not only the condensing optical system of the optical processing head but also the optical fiber is an obstacle that lowers the mobility of the overall processing apparatus.

The present invention enables to provide an optical processing apparatus in which a nozzle head can move (change its relative position) with respect to a light source and the mobility of movement of the nozzle head is improved.

The present invention enables to provide a technique of solving the above-described problem.

This can be achieved by providing an optical processing apparatus that propagates a processing light beam (light beam) in an open space from a light source to a nozzle head, captures, by the optical system of the nozzle head, the processing light beam propagated in the open space, changes the traveling direction of the captured processing light beam to the direction of the processing point of the nozzle head, and sending the processing light beam to the processing point.

Note that the open space indicates air, an inert gas, or a vacuum. Examples of the inert gas are helium gas, nitrogen gas, and argon gas.

Solution to Problem

One aspect of the present invention provides an optical processing apparatus for scanning a processing region having [[an]] at least one-dimensional spread by moving a nozzle head while irradiating the processing region with an optical processing light beam via the nozzle head, comprising:

a light source that emits, to an open space, the optical processing light beam toward the nozzle head;

a nozzle head that includes a hollow nozzle and a light beam direction changing optical system which receives the light beam emitted from the light source and propagated in the open space, and changes a propagation direction of the received light beam to a direction of the processing region in the processing region; and a main scanning direction moving mechanism that moves the nozzle head in a main scanning direction of the processing region.

Another aspect of the present invention provides a shaping apparatus for performing laminating and shaping, including the aforementioned optical processing apparatus, wherein a nozzle head includes a suction unit that sucks a powder material, and ejects the sucked powder material toward a processing point.

Advantageous Effects of Invention

According to the present invention, it is possible to improve the mobility of an optical processing apparatus.

BRIEF DESCRIPTION OF DRAWINGS

FIG. 2 is a view for explaining a principle in which a parallel light beam from a light source reaches a nozzle head without diffusion or loss of energy along with arbitrary movement of the nozzle head, and shows an arrangement in which a planar mirror for relaying and guiding the light beam from the light source to the nozzle head is provided on a slider, which moves in synchronism with movement of the nozzle head, so that the light beam from the light source reaches the nozzle head along with movement of the moving nozzle head according to the first embodiment;

FIG. 11 is a view showing an arrangement and an operation (the rotation angle (α) of a light source 2001) of causing the light beam from the light source to follow an incident opening 2022 of a moving nozzle head while the nozzle head is moved within a two-dimensional plane in the optical processing apparatus 2500 according to the second embodiment (common to Examples 1 and 2) shown in FIG. 7;

DESCRIPTION OF THE EMBODIMENTS

Figure 1:
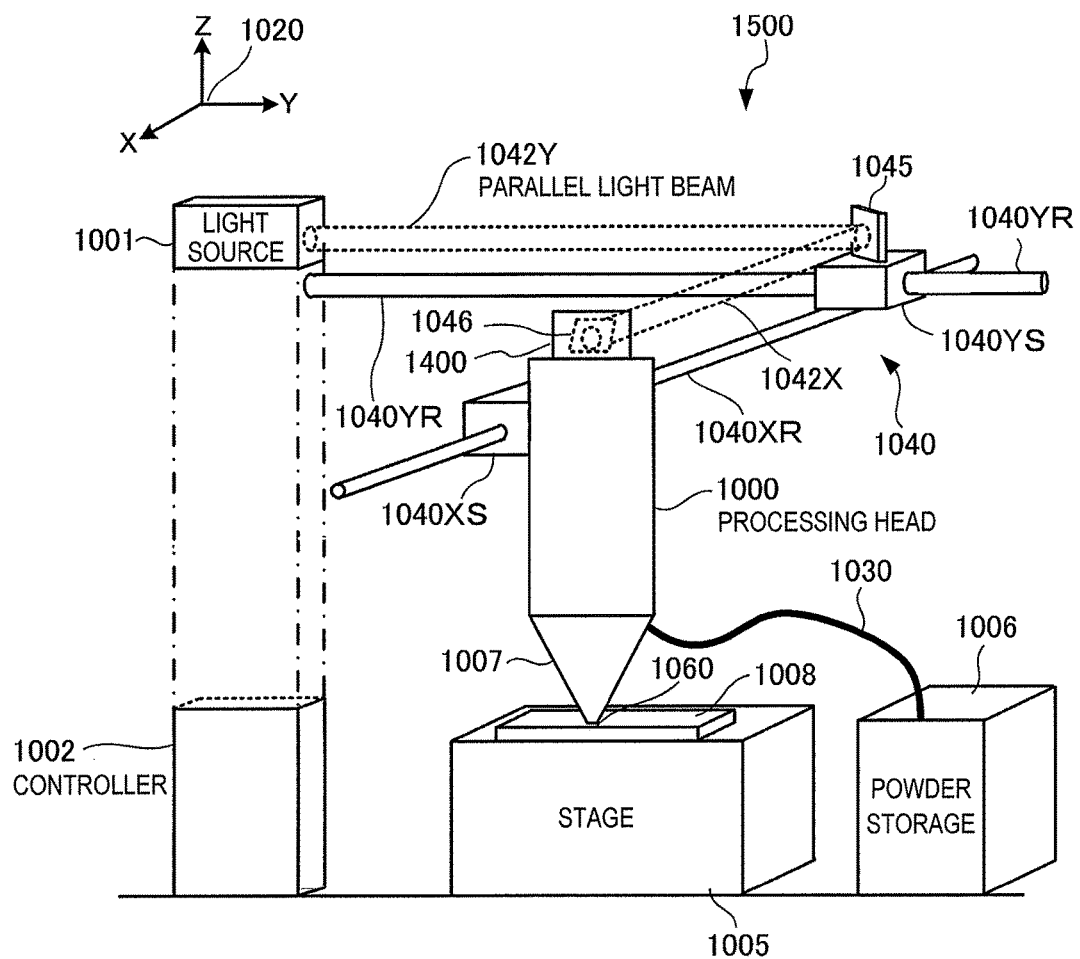
FIG. 1 is a view showing the arrangement of an optical processing apparatus according to the first embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Two embodiments and examples or modifications thereof to be described below are implemented by applying an optical processing apparatus according to the present invention to a shaping apparatus that performs laminating and formation by melting a powder material by a processing light beam (processing light, light ray, or light beam). The shaping apparatus is not substantially different from an optical processing apparatus, and will thus be collectively referred to as an "optical processing apparatus" in this specification.

<Overview of Apparatuses of Embodiments>

A processing apparatus according to the first embodiment will be described with reference to FIGS. 1 to 6. An apparatus according to the second embodiment will be described with reference to FIGS. 7 to 13.

A problem common to the apparatus according to the first embodiment, the apparatus according to the second embodiment, apparatuses according to examples of the embodiments, and an apparatus according to a modification is that when performing optical processing while moving a nozzle head, light beam energy from a light source is propagated to a processing point via the nozzle head using an open space as a propagation medium without depending on a conventional optical fiber, that is, without using a light propagation medium such as an optical fiber which may physically disturb a nozzle head operation.

The light beam energy may be the energy of an electromagnetic wave in any wavelength range, such as visible light, a millimeter wave, infrared light, or ultraviolet light.

In the first embodiment, a "parallel light beam" is used as a processing light beam emitted from the light source. On the other hand, in the second embodiment, a rotationally symmetrical mirror (spheroidal mirror or paraboloidal mirror) is used. In this case, a "condensed light beam" is used for Example 1 of the former spheroidal mirror, and a parallel light beam is used for the latter paraboloidal mirror.

First Embodiment

An optical processing apparatus according to the first embodiment and a multi-head optical processing apparatus as a modification will be described in detail below with reference to FIGS. 1 to 6.

An optical processing apparatus 1500 according to the first embodiment includes a nozzle head 1000 that moves (whose relative position is changeable) independently of a light source, similarly to an optical processing apparatus according to the second embodiment. As an application field of this apparatus, there is provided an apparatus for shaping a three-dimensional shaped object or performing overlay welding by melting a powder material in a fluid by heat generated by light condensed by the nozzle head (processing nozzle) 1000.

In addition to the nozzle head 1000, the optical processing apparatus 1500 according to the first embodiment includes a light source 1001 that generates a processing light beam (processing light, light ray, light beam) and emits the processing light beam in a form of a parallel beam (parallel light beam) toward the nozzle head 1000, a stage 1005 on which a processing substrate 1008 as a processing target is placed, a material storage device 1006 that stores the powder material, a material pipe 1030 that supplies the powder material to the nozzle head 1000, a nozzle head moving mechanism 1040 that moves the nozzle head 1000, and a controller 1002 that controls the operation of the optical processing apparatus 1500.

Although a laser source is used as the light source 1001 for the sake of convenience in this specification, an LED (Light Emitting Diode), a halogen lamp, a xenon lamp, or the like can also be used. A light beam used to melt a material is not limited to a laser beam, and any light beam capable of melting the powder material at a processing point 1060 may be used. For example, the light beam may be a microwave or an electromagnetic wave in the ultraviolet range.

The material storage device 1006 supplies a carrier gas containing the material (powder or powder material) to the nozzle head 1000 via the material pipe 1030. For example, the material is a powder material such as a metal particle or a resin particle. The carrier gas is an inert gas and may be, for example, a fluid such as argon gas, nitrogen gas, or helium gas. The material pipe 1030 is, for example, a resin or metal hose, and guides, to the nozzle head 1000, a powder flow prepared by mixing the material in the carrier gas. Note that the material may be a wire. In this case, the carrier gas is unnecessary.

The nozzle head 1000 may have, for example, a structure called a coaxial type. In this case, the nozzle head 1000 has a rotation-symmetry axis, and is formed from rotationally symmetrical outer and inner housings that are tapered toward the processing point 1060. The housings are arranged to form a gap (slit). The powder flow passes through the slit, is ejected to the processing point 1060, and is focused at the processing point 1060. At this time, by changing the width of the slit, the spot diameter of the powder can be changed. That is, by sliding the outer housing to change the slit width, the width of a linear shaped object can be changed, thereby implementing fine writing or bold writing. The controller 1002 receives a shaping condition such as fine writing or bold writing, changes the output value of the laser beam from the light source 1001 in accordance with the received shaping condition, and slides the outer housing of the nozzle head 1000. With this processing, the controller 1002 controls the powder spot diameter of the powder to be ejected from the nozzle head 1000 in accordance with the diameter of a molten pool formed on the processing substrate 1008.

<Head Scanning Moving Mechanism>

The nozzle head moving mechanism 1040 according to the first embodiment will be described in detail with reference to FIGS. 1 and 2. FIG. 2 shows the detailed arrangement of the nozzle head moving mechanism 1040 shown in FIG. 1.

The nozzle head moving mechanism 1040 according to the first embodiment performs alignment by moving the nozzle head 1000 to a desired position within an X-Y plane formed by an X-axis (1020X) and a Y-axis (1020Y) in accordance with a predetermined program in the controller 1002, and moves the nozzle head 1000 to an arbitrary coordinate position in an X-Y coordinate system. The X-Y plane is a horizontal plane perpendicular to a vertical direction, and a Z-axis (1020Z) is an axis perpendicular to the X-Y plane. The present invention, however, is not limited to this, and normal to the X-Y plane need not be in the vertical direction, and may be in any direction. If the normal to the X-Y plane is not limited to the vertical direction but is set in the vertical direction, an excessive powder material which is not used for processing drops in the vertical direction, and is thus readily collected.

One end of a Y-axis guide rail 1040YR extending in the Y-axis direction is fixed to a fixed object corresponding to a predetermined fixed position in the coordinate system of the alignment program of the controller 1002. A Y-axis slider 1040YS freely moves along the Y-axis guide rail 1040YR in accordance with the alignment program.

X-axis guide rails 1040XR are fixed to the Y-axis slider 1040YS so as to be orthogonal to the Y-axis guide rail 1040YR. The present invention, however, is not limited to this, and the X-axis guide rails 1040XR may be attached so as to obliquely intersect the Y-axis guide rail 1040YR. As described above, as the Y-axis slider 1040YS moves on the Y-axis guide rail 1040YR, the X-axis guide rails 1040XR fixed to the Y-axis slider 1040YS move while maintaining the orthogonal state (obliquely intersecting state) with respect to the Y-axis guide rail 1040YR.

An X-axis slider 1040XS freely moves on the X-axis guide rails 1040XR parallel to the X-axis. The main body of the nozzle head 1000 is fixed to this X-axis slider 1040XS. The X-axis position of the nozzle head 1000 can be aligned by moving the X-axis slider 1040XS along the X-axis guide rails 1040XR.

Similarly to the X-axis slider 1040XS, the Y-axis slider 1040YS is fixed to a predetermined position on the X-axis guide rails 1040XR, and the Y-axis slider 1040YS itself slides in the Y-axis direction (the direction of the arrow 1020Y in FIG. 1) along the Y-axis guide rail 1040YR extending through the inside but does not move in the X-axis direction (that is, the direction of the arrow 1020X).

Therefore, when moving the nozzle head 1000 to a coordinate position (x1, Y1) in accordance with a predetermined control program, a connection portion 1007 sends an instruction of moving the X-axis slider 1040XS to a position "x1" and an instruction of moving the Y-axis slider 1040YS to a position "Y1".

As described above, the nozzle head moving mechanism 1040 according to the first embodiment can align the nozzle head 1000 at a desired processing position (X, Y) by sending commands to the X-axis slider 1040XS and the Y-axis slider 1040YS via the alignment program of the controller 1002.

<Light Source>

The light source 1001 according to the first embodiment emits the parallel light beam 1042 so that a light beam reaches a planar mirror 1046 provided as a light beam direction reversing optical system in the nozzle head 1000. Note that a light source (3001) according to Example 1 of the second embodiment (to be described later) in which a spheroidal mirror is used as a light beam direction reversing optical system emits a condensed light beam. On the other hand, in the second embodiment using a paraboloidal mirror, a parallel light beam is used.

In Example 1, contrary to a case in which the nozzle head 1000 freely moves within the X-Y plane, the light source

1001 is immobile at a fixed position. The light source 1001 according to the first embodiment needs to move neither within the X-Y plane nor in the Z direction, unlike a light source (2001, 3001, or 4001) according to the second embodiment. Note that the light source according to the second embodiment need not move within the X-Y plane but may move in the Z direction.

The light source 1001 according to the first embodiment directly emits a parallel light beam (1042X or 1042Y) toward the nozzle head 1000 for one-dimensional scanning system, and emits the parallel light beam toward a light beam direction changing mirror 1045 for relaying for an X-Y two-dimensional scanning system.

Because of the property of the parallel light beam, even if the parallel light beam travels in an open space, it is kept in the parallel state. Only the light beam direction changing mirror 1045 and the planar mirror 1046 are provided between the light source 1001 and the nozzle head 1000, and an optical system such as a lens for magnifying an image is not used. Between the light source 1001 and the nozzle head 1000, even if the nozzle head 1000 moves within the X-Y plane, the distance between the light source 1001 and the light beam direction changing mirror 1045 or the distance between the light beam direction changing mirror 1045 and the planar mirror 1046 may increase or decrease but the parallel light state of the parallel light beam 1042 is maintained, that is, the energy density of the light beam at the time of emission is maintained, and the parallel light beam 1042 reaches the nozzle head 1000.

In this embodiment, the light beam direction changing mirror 1045 and the planar mirror 1046 are fixed to the Y-axis slider 1040YS and the nozzle head 1000, respectively. However, a method is also considered in which even if the nozzle head 1000 arbitrarily moves within the X-Y plane, when the light beam direction changing mirror 1045 and the planar mirror 1046 cooperate with each other, the parallel light beam is guided to the planar mirror 1046 of the moved nozzle head 1000 in real time.

<Arrangement of Nozzle Head>

The nozzle head (or optical processing head) 1000 includes the nozzle portion 1007, and the nozzle portion 1007 includes, for example, concentric double-layer hollow pipe passage. The present invention, however, is not limited to such structure. Furthermore, as shown in FIGS. 1 to 4, the nozzle head 1000 includes the nozzle portion 1007 and an optical system portion. A condensed light beam passes through the pipe passage on the central side of the nozzle portion 1007, and a powder flow passes through the outer pipe passage. The light beam and powder flow exit from the distal end of the nozzle head 1000, and meet at the processing point on the processing substrate 1008 to form a molten pool, thereby performing shaping.

In the nozzle portion 1007 of the nozzle head 1000, the powder supplied from the material storage device 1006 is supplied to the processing point 1060 together with the processing light beam (processing light, light ray, or light beam) condensed toward the processing point 1060 by the condensing optical system of the nozzle head 1000. As a result, both the processing light beam and the powder are sent from the exit of the nozzle portion 1007 to the processing point 1060, and the powder is melted by heat of the processing light beam (processing light, light ray, or light beam), as described above.

The nozzle head 1000 includes a condenser lens 1070 (see FIG. 2) that condenses a light beam (light), and the nozzle portion 1007 is attached to the downstream side of the condenser lens 1070. The laser beam supplied to the nozzle head 1000 is adjusted to be condensed at the processing point 1060 via the condenser lens 1070 provided inside, and the processing point 1060 is irradiated with the laser beam through the inside of the nozzle portion 1007. Note that the condenser lens 1070 is provided so as to control the condensing position by controlling a relative position with respect to the nozzle portion 1007.

The condenser lens 1070 is provided immediately above the nozzle portion 1007, and the processing light beam (processing light, light ray, or light beam) whose energy density is increased by condensing the parallel light beam 1042 from the light source 1001 reaches the processing point 1060.

Immediately above the condenser lens 1070, normal to the planar mirror 1046 is provided while being inclined by 45° with respect to both the X-axis and the Z-axis.

In the arrangement shown in FIG. 1 or 2, when the parallel light beam 1042X parallel to the X-axis guide rails 1040XR enters the planar mirror 1046, an optical path is deflected by 90° along the Z-axis by reflection, and the parallel light beam 1042 is kept and travels toward the condenser lens 1070.

<Operation of Light Beam Direction Changing Mirror 1045>

The tracking operation of the parallel light beam (parallel light beam) as the processing light beam (processing light, light ray, or light beam) with respect to movement of the nozzle head (processing head) will be described next with reference to FIGS. 2 to 5.

While the nozzle head 1000 moves, the optical processing apparatus 1500 can shorten the lead time of processing by continuously supplying the processing light beam to the nozzle head 1000. The present invention, however, is not limited to this, and the processing light beam may be a pulse laser beam. In some cases, by stopping the processing light beam, cooling of the shaped object is accelerated, thereby improving the shaping accuracy. On the other hand, the light source 1001 according to the first embodiment is placed at the fixed position, and never moves in any of the X, Y, and Z directions.

Figure 3:
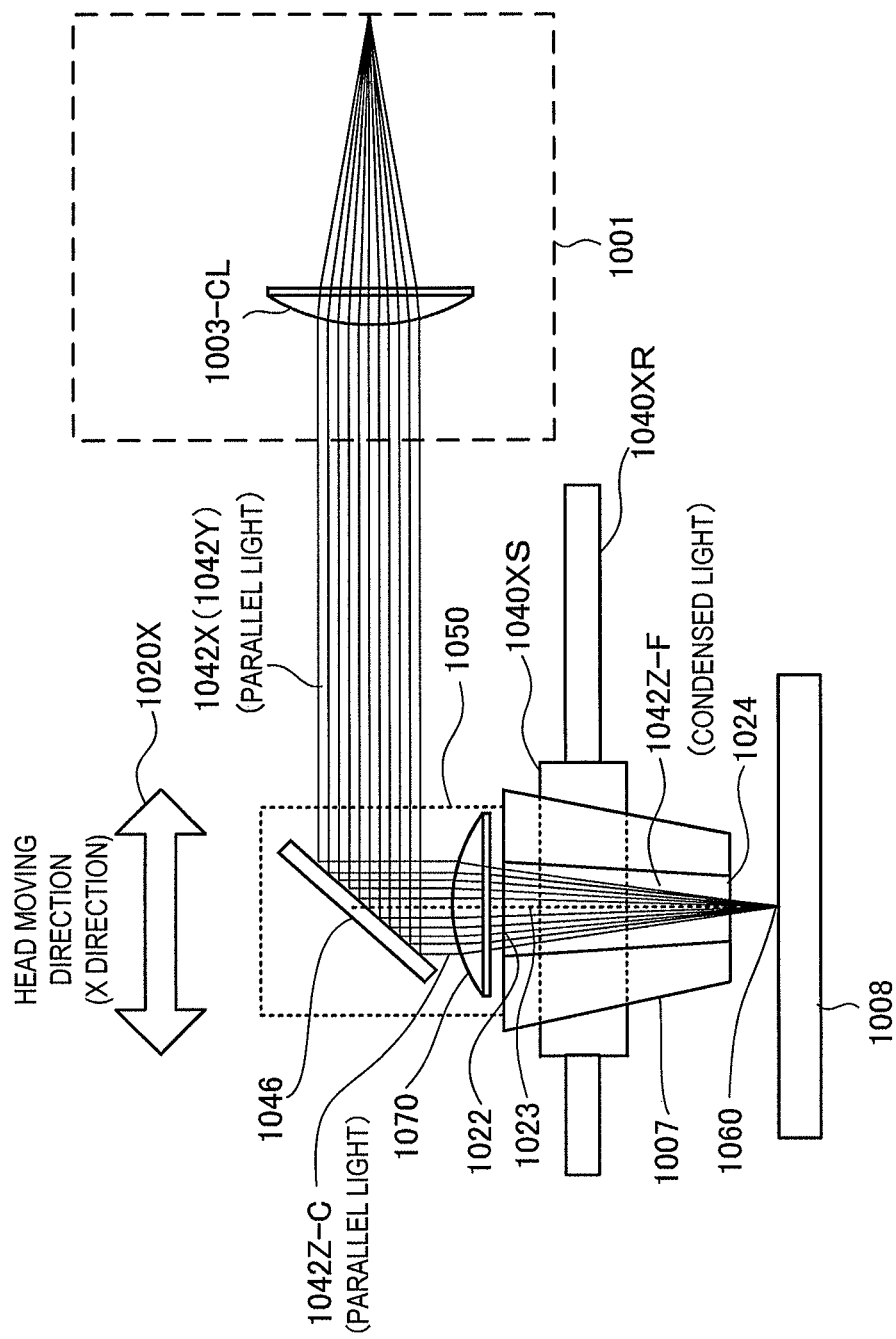
FIG. 3 is a view showing the arrangement of a light beam direction changing optical system 1400 according to the first embodiment of the present invention, and specifically shows a case in which a light beam that travels along X-axis guide rails 1040XR is refracted toward a condenser lens 1070 by a plane mirror 1046 of the light beam direction changing optical system 1400, and the condenser lens 1070 condenses the parallel light beam to be focused at a processing point 1060.

In the processing apparatus 1500 according to the first embodiment, the planar light beam direction changing mirror 1045 is provided on the Y-axis slider 1040YS, as shown in FIGS. 1 to 3, so as to cause the processing light beam emitted from the light source 1001 in the Y-axis direction 1020Y to reach the nozzle head 1000. This can reflect the light beam in the X-axis direction 1020X.

With this arrangement, it is unnecessary to change the relative position of the light beam direction changing mirror 1045 with respect to the Y-axis slider 1040YS in accordance with movement of the nozzle head 1000. That is, the driving mechanism of the light beam direction changing mirror 1045 is unnecessary, and thus a simple arrangement is obtained.

The processing light beam (light ray, light beam, or parallel light beam) which is reflected by the light beam direction changing mirror 1045 and propagates in the X-axis direction 1020X is deflected in the lower direction (the Z direction 1020Z) toward the nozzle portion 1007 by the planar mirror 1046 provided on the X-axis slider 1040XS.

In the first embodiment, normal to the light beam direction changing mirror 1045 on the Y-axis slider 1040YS is inclined by 45° with respect to both the Y-axis and the X-axis, and is orthogonal to the Z-axis direction. Similarly, the planar mirror 1046 on the nozzle head 1000 is inclined by 45° with respect to the Y-axis and the Z-axis.

Since the X-axis and the Y-axis are parallel to the X-axis guide rails 1040XS and the Y-axis guide rail 1040YS, respectively, a plane formed by the X-axis guide rails 1040XS and the Y-axis guide rail 1040YS is parallel to the X-Y plane formed by the X-coordinate axis and the Y-coordinate axis. A plane formed by the light beam 1042Y emitted from the light source 1001 toward the side of the Y-axis slider 1040YS and the light beam 1042X reflected by the light beam direction changing mirror 1045 provided on the Y-axis slider 1040YS is also parallel to the X-Y plane.

The light beam (parallel light beam) 1042Y emitted from the light source 1001 is converted into the light beam (parallel light beam) 1042X along the X-axis guide rails 1040XS by the light beam direction changing mirror 1045 provided on the Y-axis slider 1040. With this processing, a light beam having the same incident angle always enters the planar mirror 1046. Therefore, even if the nozzle head 1000 fixed to and provided on the X-axis slider 1040XS is moved to any position by the X-axis slider 1040XS and the Y-axis slider 1040YS, the light beam emitted from the light source 1001 follows the movement of the nozzle head 1000, and thus reaches the nozzle portion 1007 of the nozzle head 1000 with high accuracy.

In the first embodiment, even if the nozzle head 1000 is moved to any position on the X-Y plane, the processing light beam 1042 is guided to the position of the nozzle head 1000 by the light beam direction changing mirror 1045 and the planar mirror 1046. That is, as described above, in the processing apparatus 1500 according to the first embodiment, even if the nozzle head 1000 moves, the processing light beam accurately follows the movement of the nozzle head 1000, and reaches the nozzle head 1000.

The processing apparatus 1500 according to the first embodiment does not change the energy of the light beam which reaches the nozzle head (processing head or optical processing head) 1000, regardless of the position, moving speed, and moving direction of the nozzle head (processing head or optical processing head) 1000. In other words, loss of the energy of the light beam caused by propagation in the open space is minimum.

FIG. 3 is an X-Z sectional view showing the arrangement of a light beam direction changing optical system 1400 provided in the nozzle head 1000. The light beam direction changing optical system 1400 includes the planar mirror 1046 that changes the propagation direction of the parallel light beam 1042X parallel to the X-axis to the Z-axis direction (a light beam "1042Z-C" shown in FIG. 3 is obtained), and the condenser lens 1070 that condenses the light beam whose direction has been changed to the Z-axis direction. Condensed light 1042Z-F enters an opening portion 1022 of the inner pipe passage of the nozzle portion 1007, and exits toward the processing point 1060. As described above, the powder flow passes through the outer pipe passage of the nozzle portion 1007, and is blown toward the processing point 1060. Thus, lamination processing and the like are performed at the processing point 1060 with the condensed light 1042Z-F. In the lamination processing step, the nozzle head 1000 can perform laminating processing in a two-dimensional planar region by movement of the X-axis slider 1040XS or the Y-axis slider 1040YS.

FIG. 3 shows only the X-axis guide rails 1040XR on which the X-axis slider 1040XS slides among the two kinds of guide rails for the sake of simplicity, and does not show the Y-axis slider 1040YS and the like. That is, in FIG. 1, the light beam emitted from the light source 1001 travels toward the Y-axis slider 1040YS. However, FIG. 3 does not show the Y-axis slider 1040YS, and shows only the light beam traveling toward the planar mirror 1046 of the X-axis slider 1040XS.

Figure 5:
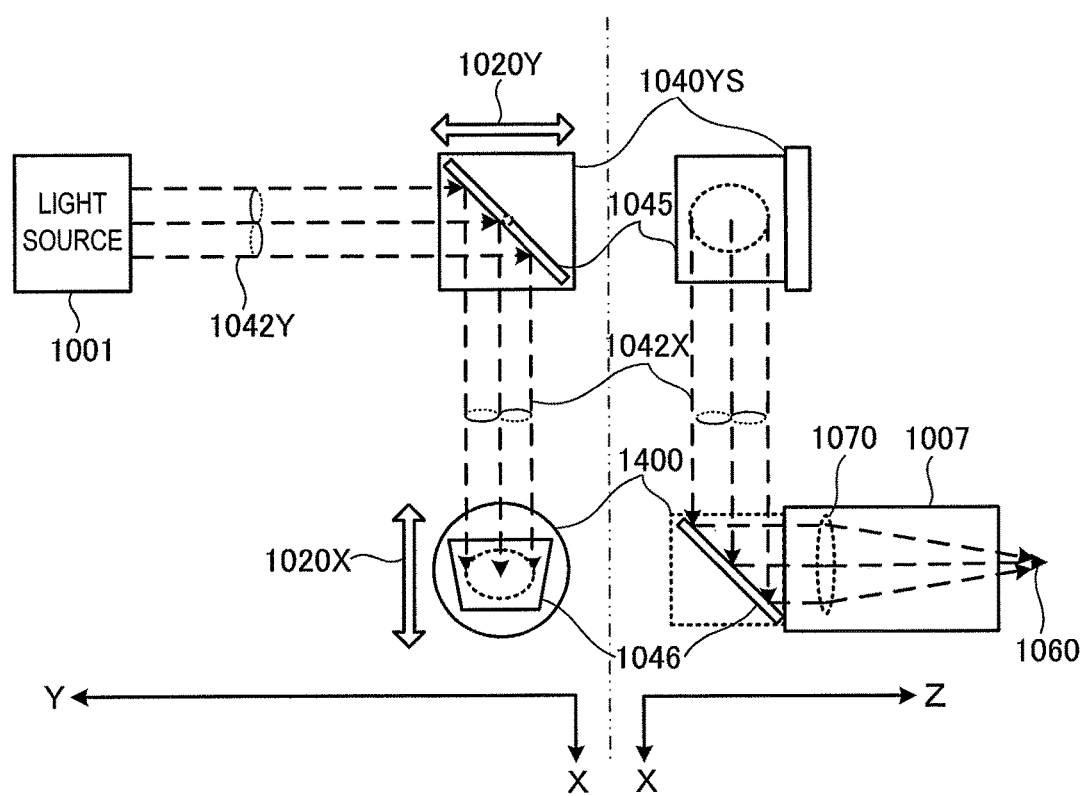
FIG. 5 is a view showing a case in which even if the nozzle head is translated in a Y-axis direction (1020Y), a light beam 1042Y parallel to the Y-axis direction is made to reach a nozzle head 1000 by a plane mirror 1045 inclined by 45° with respect to the Y-axis, and also showing a case in which even if the nozzle head is translated (1020X) with respect to the X-axis, the light beam 1042Y from the light source is converted into a light beam parallel to the direction 1020X by the mirror 1046 and thus the light beam 1042Y is made to reach the nozzle head 1000 according to the first embodiment of the present invention.

FIGS. 1, 2, and 5 show both the Y-direction light beam 1042Y and the X-direction light beam 1042X without omission.

Referring to FIG. 3, the light emitted from the light source 1001 becomes a parallel light beam by the function of a condenser lens 1003-CL. The parallel light beam (parallel light) 1042Y emitted from the light source 1001 enters the light beam direction changing mirror 1045 of the Y-axis slider 1040YS, and is deflected by 90° by reflection to enter the planar mirror 1046 of the X-axis slider 1040XS in FIG. 1, 2, or 5. The total reflection mirror 1046 deflects the parallel light beam (parallel light) 1042X by 90° by reflection to enter the condenser lens 1070 facing in the lower direction (vertical downward direction). The condenser lens 1070 condenses the condensed light 1042Z-F toward the processing point 1060.

Referring to FIG. 3, the parallel light beam (parallel light) 1042X from the light source 1001 reaches the planar mirror 1046 of the X-axis slider 1040XS through the light beam direction changing mirror 1045 (not shown in FIG. 3). The parallel light beam (parallel light beam) 1042Z-C reflected and deflected by the planar mirror 1046 enters the condenser lens 1070. The condenser lens 1070 converts the parallel light beam into the condensed light (condensed light beam) 1042Z-F toward the processing point 1060.

As described above, in FIGS. 1, 2, 3, and 5, the parallel light beam from the light source 1001 enters the planar mirror 1046 arranged on the X-axis slider 1040XS provided with the nozzle head 1000 while keeping the parallel light beam state, is reflected by the planar mirror 1046 to change the direction while keeping the parallel light beam state, is converted into the condensed light 1042-F by the condenser lens 1070, and is thus used for processing at the processing point 1060.

That is, in FIGS. 1, 2, 3, and 5, since the parallel light beam is kept from the light source 1001 to the nozzle head 1000, the parallel light beam is maintained regardless of movement of the X-axis slider 1040XS and movement of the Y-axis slider 1040YS. Therefore, the processing light beam (processing light, light ray, or light beam) is kept in the parallel light state without condensing or diverging between the light source 1001 and the planar mirror 1046. That is, the energy of the processing light beam (processing light, light ray, or light beam) received by the planar mirror 1046 of the nozzle head 1000 is equal to that of the processing light beam emitted from the light source 1001. In other words, regardless of the position within the X-Y plane to which the nozzle head 1000 moves and the speed at which the nozzle head 1000 moves, the processing point 1060 is irradiated with the same amount of energy. That is, uniform melting processing is implemented.

Figure 4:
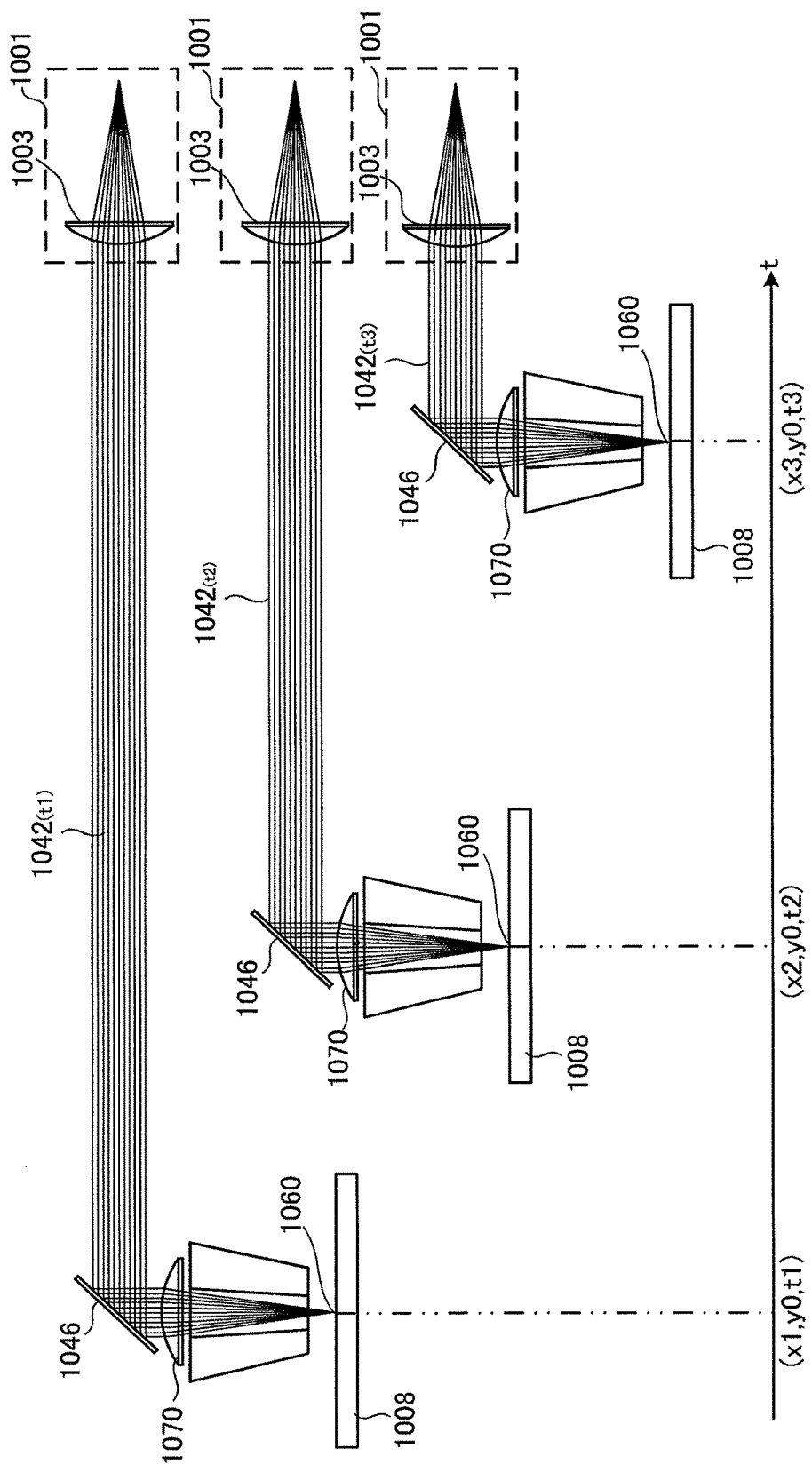
FIG. 4 is a view showing a case in which the processing apparatus according to the first embodiment of the present invention, along with movement of the nozzle head on an X-Y plane with time (t1→t2→t3), the processing point (the condensing point or the focus point of the light beam) moves while continuously condensing light at one point (1060) on a processing substrate 1008.

FIG. 4 is a view showing the nozzle head 1000 and the light source 1001 while the Y-axis slider 1040YS stops at a coordinate position Y0 for the sake of simplicity. When time t changes like t1→t2→t3, the coordinate value of the X-axis slider 1040XS changes like x1→x2→x3. At this time, even if the path of the parallel light beam 1042 changes like 1042(t1)→1042(t2)→1042(t3), and the path length changes, the state of the parallel light is maintained. Therefore, the irradiation energy of the processing light beam at the processing point 1060 remains unchanged and is constant. Consequently, processing at the processing point 1060 is performed in accordance with the specifications of the processing program.

Effects of First Embodiment

The above-described optical processing apparatus according to the first embodiment can obtain the following effects.

A: The nozzle head 1000 and the light source 1001 are separated, and can change the relative positions independently of each other. The processing light beam is sent from the light source 1001 to the nozzle head 1000 in an open space. Thus, the necessity of the fiber cable which disturbs the moving operation of the head in the conventional technique is eliminated between the nozzle head 1000 and the light source 1001, thereby making it possible to improve the mobility of movement of the nozzle head 1000.

B: The light source 1001 can convert a light beam into a parallel light beam using the lens 1003-CL, as shown in FIG. 3. That is, the light source spot of the light source 1001 and the condensing spot on the side of the processing point 1060 have a conjugate relationship. This can change the size of the condensing spot on the side of the processing point 1060 by changing the size of the light source spot. That is, an effect capable of adjusting a shaping width at the time of optical processing is obtained. To make the light source spot variable, a mechanism such as a zoom lens is used. Furthermore, it is possible to improve the shaping accuracy by changing the beam profile of the light beam emitted from the light source 1001. At this time, a mechanism of changing the beam profile is provided in the light source 1001.

As described above, the zoom lens mechanism (light source spot changing mechanism) of making the light source spot variable and the beam profile changing mechanism can be provided in the light source 1001. This can lighten the nozzle head 1000, as compared with a case in which these mechanisms are provided in the nozzle head 1000, thereby improving the mobility.

C: Since the parallel light beam is used to propagate the light beam energy from the light source 1001 to the nozzle head 1000, even if the relaying optical system (1045) and the light beam direction changing optical system (1046) exist in a portion where the light beam from the light source 1001 passes though before reaching the nozzle head 1000, the light beam energy is not diverged or focused. Thus, regardless of movement of the nozzle head 1000, optical processing can be implemented at the condensing point (processing point) with uniform energy, thereby improving the processing accuracy.

D: The moving mechanism of the nozzle head 1000 can propagate the parallel light beam from the light source 1001 in parallel to the Y-axis slider YS and the parallel light beam to the nozzle head 1000 in parallel to the X-axis slider XS by the relaying optical system (1045) and the light beam direction changing optical system (1046). This can always make the incident state (incident angle and incident position) of the parallel light beam entering the planar mirror 1046 constant regardless of movement of the nozzle head 1000. With this arrangement, the light beam reaching the nozzle head 1000 is a parallel light beam of the same energy density as that of the light beam emitted from the light source 1001. This keeps the uniform processing accuracy of the lamination processing in all processing target regions.

E: The light beam direction changing mirror 1045 and the planar mirror 1046 are fixed to the sliders 1040XS and 1040YS, respectively, and need not change the relative positions with respect to the sliders 1040XS and 1040YS in accordance with movement of the nozzle head 1000.

F: The above effects are obtained under the following conditions.
  The light beam from the light source 1001 is kept in the parallel light state until it reaches the condenser lens 1070.
  The light 1042Y emitted from the light source 1001 is parallel to the Y-axis, and the moving direction of the light beam direction changing mirror 1045 which moves in the Y-axis direction together with the X-axis guide rails 1040XR parallel to the X-axis is also parallel to the Y-axis.
  The parallel light 1042X is parallel to the X-axis guide rails XR.

G: That is, regardless of a displacement of the nozzle head 1000 in the azimuth direction with respect to the light source 1001, which occurs when the nozzle head 1000 two-dimensionally moves on the X-Y plane, it is possible to ensure the followability of the light emitted from the light source 1001 with respect to the planar mirror 1046 of the nozzle head 1000 which freely moves within the two-dimensional plane by absorbing the displacement by movement of the light beam direction changing mirror 1045 according to the first embodiment.

Modification of First Embodiment

The processing apparatus 1500 according to the above-described first embodiment can scan the two-dimensional plane using two kinds of guide rails, that is, the X-axis guide rails 1040SR and the Y-axis guide rail 1040YR. This embodiment is also applicable to only the X-axis guide rails 1040SR or the Y-axis guide rail 1040YR, that is, a processing apparatus for a one-dimensional operation. Similarly, the first embodiment has explained the application example in which the single nozzle head 1000 is included. However, a modification in which a plurality of processing heads (multi-head) are used is also possible.

An example in which a plurality of (five) processing heads are used will be described as a modification (multi-head example) of the first embodiment with reference to FIG. 6.

A processing apparatus 1700 according to this modification is configured so that five processing heads (HEAD-#1 to HEAD-#5) are freely aligned on a plane formed by five pairs of X-axis direction guide rails (X-GR(n)) parallel to the X-axis and a pair of Y-axis guide rails (Y-GR(n)) parallel to the Y-axis, similarly to the first embodiment. Each processing head (HEAD) according to the modification is the same as the nozzle head 1000 shown in FIG. 2 according to the first embodiment. That is, each processing head (HEAD) includes a total reflection mirror (FM) that refracts parallel light parallel to the X-axis in the vertical downward direction, and an X-axis slider (X-SLD) that moves the total reflection mirror (FM) by moving along the X-axis guide rails (X-GR).

The nth X-axis guide rails (X-GR(n)) are supported by a Y-axis slider (Y-SLD(n)) that freely moves along the Y-axis guide rails (Y-GR). Thus, the arbitrary nth Y-axis slider (Y-SLD(n)) moves on the Y-axis guide rail (Y-GR), and the X-axis slider (X-SLD(n)) moves in the X-axis direction on the X-axis guide rails (X-GR(n)) supported by the moving Y-axis slider (Y-SLD(n)), thereby making it possible to align the arbitrary head (HEAD(n)) at an arbitrary coordinate position on the X-axis and Y-axis.

A mirror HM provided on the Y-axis slider (Y-SLD(n)) is a half mirror that partially reflects an incident light beam and partially transmits the incident light beam, unlike the light beam direction changing mirror 1045 according to the first embodiment.

Figure 6:
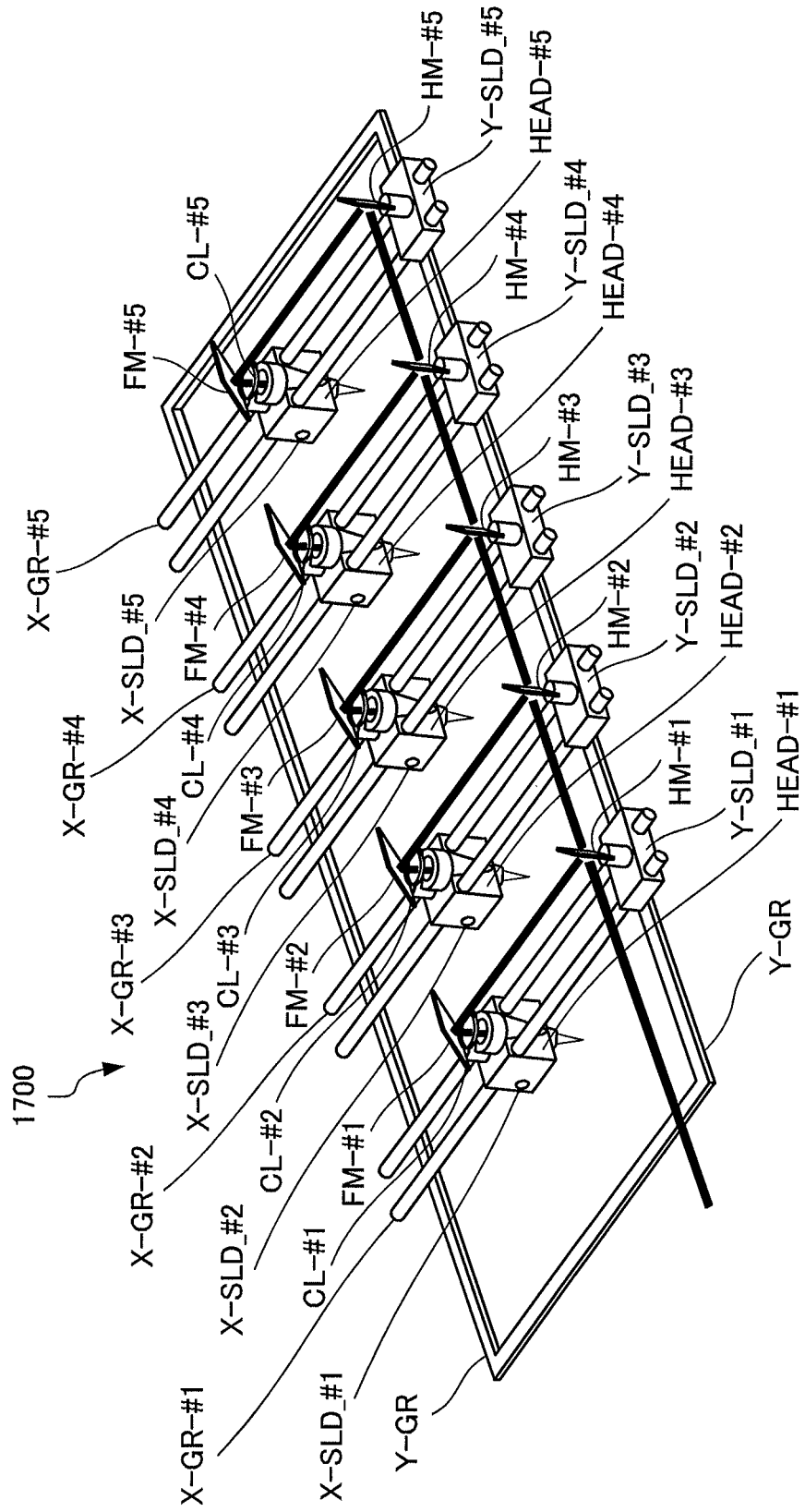
FIG. 6 is a view showing an arrangement according to a modification wherein the optical processing apparatus according to the first embodiment of the present invention is applied to a multi-head optical processing apparatus in which a plurality of heads are arranged along the Y-axis.

The processing apparatus shown in FIG. 6 according to the modification is an example in which the five processing heads (HEAD(n)) share one processing line beam from one light source (not shown). By distributing the energy of the light beam from one light source to the five processing heads (HEAD(n)), and appropriately adjusting the transmittances (T) and reflectances (R) of the half mirrors (HM(n)), it is possible to individually control the energy amounts of the light beams entering the total reflection mirrors (FM(n)) of the respective processing heads (HEAD(n)).

Settings shown in the following table (table 1) are used as the transmittances (T) and reflectances (R) of the respective half mirrors (HM(m)) when setting the equal energy amounts for the respective processing heads (HEAD(n)) in the multi-head arrangement according to the modification shown in FIG. 6. The number of processing heads (HEAD (n)) is five which is represented by n. When I (W: watt) represents the energy of one parallel light beam from the light source, it is equally supplied to the respective five processing heads (HEAD(n)). Based on this design, energy for each processing head is I/5 (W).

TABLE 1

| processing head | energy (W) to be supplied to head | energy (W) input from adjacent HM | half mirror (HM) reflectance R(%) | transmittance T(%) |
|---|---|---|---|---|
| HEAD(#1) | 1/5 × I | 5/5 × I | 20%(=1/5) | 80%(=4/5) |
| HEAD(#2) | 1/5 × I | 4/5 × I | 25%(=1/4) | 75%(=3/4) |
| HEAD(#3) | 1/5 × I | 3/5 × I | 33%(=1/3) | 67%(=2/3) |
| HEAD(#4) | 1/5 × I | 2/5 × I | 50%(=1/2) | 50%(=1/2) |
| HEAD(#5) | 1/5 × I | 1/5 × I | 100%(=1/1) | 0%(=0/1) |

According to the multi-head modification of the first embodiment, based on the above settings, the energy amounts supplied to the respective processing heads (HEAD (n)) are all I/5 (W) when energy emitted from the light source is I (W).

As is apparent from table 1, the reflectance of the mth half mirror (FM(m)) is 1/(n−m+1)*100.

Second Embodiment

The second embodiment eliminates the necessity of the planar mirror 1046 as a light beam direction reversing optical system adopted in the first embodiment by replacing it by a rotationally symmetrical mirror. Furthermore, adopting this mirror has an advantage that the two functions of the reversing optical system and condenser lens of the first embodiment can be integrated in the mirror.

<Overall Arrangement of Processing Apparatus>

The concept of an optical apparatus according to the second embodiment will be described with reference to FIG. 7.

An optical processing apparatus 2500 according to the second embodiment includes a light source 2001, a nozzle head 2000, a scanning moving mechanism (not shown) that moves the nozzle head 2000, a control apparatus (not shown), and a material supply system (not shown), similarly to the first embodiment. The light source 2001 emits a light beam 2042 (or light) toward the head 2000. Thus, the optical processing apparatus according to the second embodiment does not require a light beam propagation medium such as an optical fiber between the light source 2001 and the nozzle head 2000, similarly to the optical processing apparatus according to the first embodiment.

<Scanning Moving Mechanism of Second Embodiment>

In the second embodiment, the moving mechanism 1040 according to the first embodiment is used intact. Thus, FIGS. 7 to 13 do not show the head scanning moving mechanism.

The scanning moving mechanism according to the second embodiment is different from the moving mechanism 1040 according to the first embodiment in that the planar mirror 1046 and the light beam direction changing mirror 1045 are unnecessary. The light beam direction changing mirror 1045 according to the first embodiment sends, to the planar mirror 1046 in parallel to the X-axis, the parallel light beam 1042 sent along the Y-axis from the light source 1001. In the second embodiment in which a light beam from the light source 2001 is directly sent to the nozzle head, it is not necessary to use the light beam direction changing mirror 1045.

<Light Source>

The light source 2001 according to the second embodiment is fixed to the optical processing apparatus 2500. The light source 2001 may be, for example, a 3D scanner available from RAYLASE. It is possible to freely scan the condensing point of a light beam from the 3D scanner within a three-dimensional space. At this time, it is possible to make the condensing point follow an incident opening formed in the nozzle head 2000. The arrangement of the light source 2001 varies. For example, the light source 2001 may partially operate, may be fixed in the X-coordinate direction and Y-coordinate direction, and need not be fixed in the Z direction and a rotation direction about the vertical axis of the light source 2001. This arrangement can cause the light beam from the light source 2001 to enter the incident opening formed in the nozzle head 2000. At this time, the light source 2001 according to the second embodiment needs to adjust the height position (height adjustment) of the light source 2001 with respect to the Z-coordinate (see FIG. 12), the azimuth direction (angle Δα in FIG. 11) of the light source 2001, and the tilt angle (angle Δβ in FIG. 13) of the light source 2001. This will be described later with reference to FIGS. 11 to 13.

The light source 2001 according to the second embodiment may be a solid-state laser, fiber laser, halogen lamp, xenon lamp, or the like, similarly to the first embodiment. The present invention, however, is not limited to this, and any light source that generates an electromagnetic wave may be used.

The light source 2001 is rotated by a turret table 2800 that causes the light source to pivot about a Z-axis (2020Z) by an angle α.

<Nozzle Head>

In a nozzle 2007 of the nozzle head 2000, a processing light beam condensed toward a processing point 1060 by a light beam direction changing optical system (rotationally symmetrical mirror) 2400 is supplied to the processing point 1060 together with a powder supplied from a powder storage device 1006. As a result, the powder is melted at the processing point 1060 by heat of the processing light beam to form a molten pool, as described above.

The light source 2001 emits the light beam 2042 to the nozzle head 2000. The light beam 2042 reaches an incident opening 2022 of the nozzle head 2000, and the rotationally symmetrical mirror 2400 changes the optical path of the light beam 2042 in the vertical direction. A light beam 2042-F whose direction has been changed enters the nozzle 2007 via an exit opening 2024, and performs optical processing at the processing point 1060 on a processing substrate 1008 at the distal end of the nozzle.

<Adoption of Light Beam Direction Changing Optical System (Rotationally Symmetrical Mirror)>

The nozzle head 2000 includes the light beam direction changing optical system 2400 that changes, in the nozzle head 2000, the light beam direction of the light beam 2042 from the light source 2001. The rotationally symmetrical mirror 2400 is used as the light beam direction changing optical system 2400, unlike the planar mirror (1046) according to the first embodiment. Practical examples of the rotationally symmetrical mirror 2400 are a spheroidal mirror 3400 (Example 1; see FIGS. 8 and 9) and a paraboloidal mirror 4400 (Example 2; see FIG. 10).

The spheroidal mirror 3400 (Example 1) and the paraboloidal mirror 4400 will be collectively referred to as "rotationally symmetrical mirrors" hereinafter.

The rotationally symmetrical mirror 2400 has a rotation-symmetry axis coincident with the central axis of the nozzle 2007, and a mirror surface is formed inside the nozzle 2007. The rotationally symmetrical mirror 2400 can form at least one focus point, and the focus point can be set on the processing point side with respect to the nozzle 2007.

On the other hand, since the mirror surface is formed in the rotationally symmetrical mirror 2400 to be rotationally symmetrical around the central axis of the nozzle head 2000, a sequence of focus points formed by the rotationally symmetrical mirror surface can be made coincide with the central axis of the nozzle head 2000, thereby forming such mirror surface.

<Correction of Orientation Direction of Emitted Light Beam>

As an technical advantage of setting the shape of the rotationally symmetrical mirror 2400 to be rotationally symmetrical around the central axis of the nozzle head 2000, in a step in which the nozzle head 2000 according to the second embodiment moves in an arbitrary direction within the X-Y plane, changes ΔX and ΔY in position coordinates increase. When Δα represents the displacement amount of the azimuth, $$\tan \Delta \alpha = \frac{\Delta Y}{\Delta X} \quad (1)$$

According to equation (1), if a moving amount ΔX in the X direction is relatively small, or a moving amount ΔY in the Y direction is large, Δα becomes large. The light source 2001 can continuously irradiate the incident opening 2022 of the nozzle head 2000 with the processing light beam. Adjustment for making the light beam emission direction of the light source 2001 coincident with the direction of the incident opening portion 2022 of the nozzle head 2000 can be implemented when the turret mechanism (turret table) 2800 of the light source 2001 causes the light source 2001 to rotate about the pivot axis 2020Z by the angle α, as shown in FIG. 7.

FIG. 11 shows a case in which when a focus point F of the processing light beam 2042 by the nozzle head 2000 is to move from a coordinate position XYZ (X0, Y0, Z) to a coordinate position (X1, Y1, 0), the optical processing apparatus 2500 according to the second embodiment causes the light source 2001 at a coordinate position XYZα (0, 0, L0, 0) to rotate by the angle α.

Referring to FIG. 11, when the focus point F on the rotation-symmetry axis of the rotationally symmetrical mirror 2400 is to move on the X-Y horizontal plane from a position (X0, Y0, 0) to a position (X1, Y1, 0), the displacement amount Δα of the azimuth of the light beam 2042 emitted from the light source 2001 is given by:

$$\tan \Delta \alpha = \frac{Y_1 - Y_0}{X_1 - X_0} \quad (2)$$

Consequently, in the second embodiment, when the nozzle head 2000 is to move from the position (X0, Y0, 0) to the position (X1, Y1, 0), the light beam 2042 from the light source 2001 can capture the incident opening 2022 of the nozzle head 2000 by being rotated by the azimuth change Δα.

In this case, the scanning moving mechanism of the nozzle head 2000 is implemented by the two-dimensional table of the X-axis and Y-axis, similarly to the first embodiment. Thus, the orientation of the nozzle head 2000 itself with respect to the X-axis and Y-axis remains unchanged. The orientation angle (an angle of 0° in FIG. 11) of the nozzle head 2000 with respect to the X-axis when the nozzle head 2000 is at the position (X0, Y0, 0) remains unchanged even when the nozzle head 2000 moves to the position (X1, Y, 0). However, the angle of the nozzle head 2000 with respect to the light beam 2042 changes from 0° with respect to a light beam 2042-0 at the position (X0, Y0, 0) to Δα at the position (X1, Y1, 0).

The property of the rotation symmetry of the nozzle head 2000 about the central axis of the rotationally symmetrical mirror 2400 according to the second embodiment has the effect capable of performing the same light beam conversion even if the orientation displacement Δα of the nozzle head 2000 with respect to the light beam 2042 changes.

Figure 12:
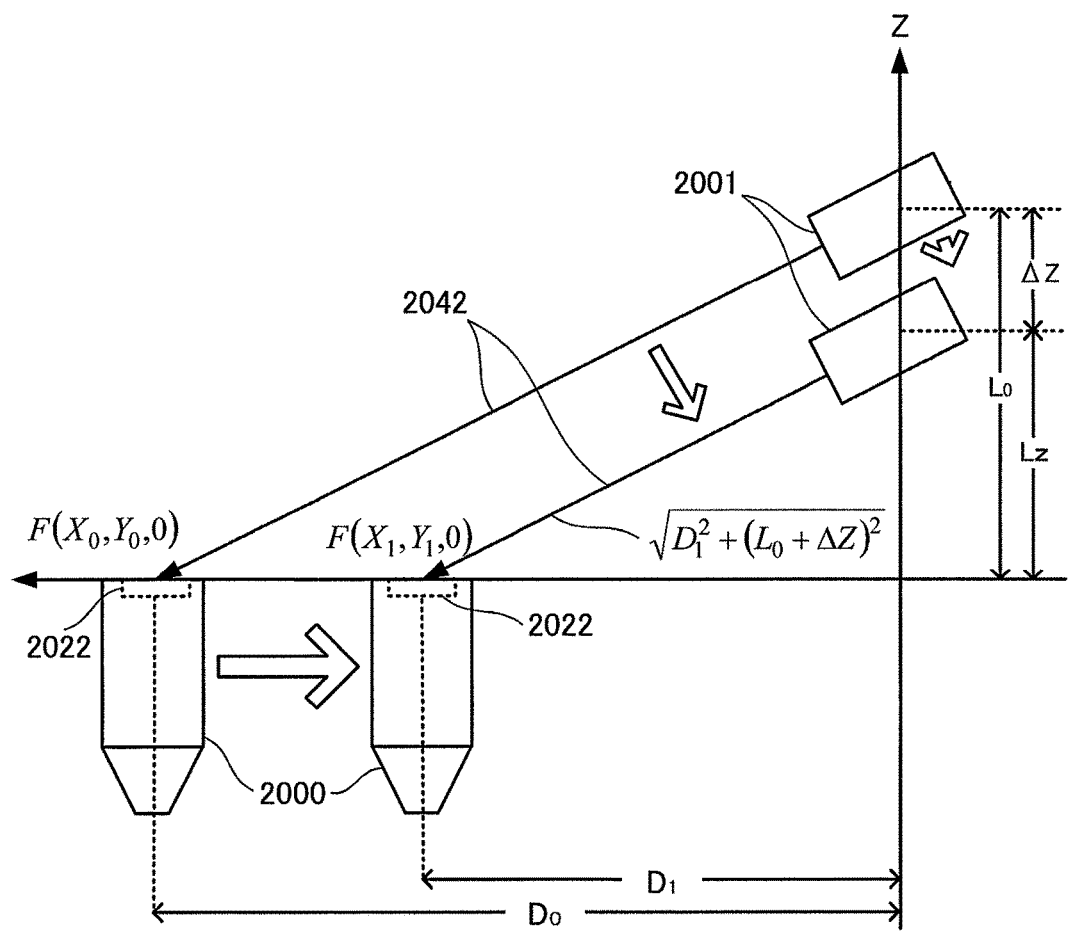
FIG. 12 is a view for explaining the reason why it is necessary to adjust the height (Lz) of the light source 2001 in the Z-axis direction in order to allow the incident light beam to follow the incident opening 2022 when the distance from the light source changes due to movement of the nozzle head 2000 in the optical processing apparatus 2500 according to the second embodiment (common to Examples 1 and 2) in which the light source is arranged on the obliquely upper side of the nozzle head.

FIG. 12 shows a case in which the nozzle head 2000 according to the second embodiment moves from the coordinate position (X0, Y0, 0) to the coordinate position (X1, Y, 0), and a distance D from the light source 2001 to the incident opening 2022 of the nozzle head 2000 changes (from D0 to D1). FIG. 12 shows the fact that if the height of the light source 2001 is displaced by AZ from an initial height position L0, even if the position of the nozzle head 2000 changes from the position (X0, Y0, 0) to the position (X1, Y1, 0), the direction of the light beam 2042 from the light source 2001 need not be changed.

If the initial height L0 of the light source 2001 is known, an adjusted height Lz of the light source 2001 is obtained by simple calculation, given by:

$$L_z = \frac{\sqrt{X_1^2 - Y_1^2}}{\sqrt{X_0^2 - Y_0^2}} \bullet L_0 \quad (3)$$

The example of FIG. 12 assumes that movement with respect to the Z-axis of the light source 2001 in the Z-axis direction of the light source 2001 is translation, and the tilt angles β of the light beam emission direction with respect to the Z-axis of the light source 2001 before and after movement are known, and are equal to each other.

Even if the nozzle head 2000 moves within the X-Y horizontal plane, the light beam 2042 from the light source 2001 can continuously capture the incident opening 2022 of the nozzle head 2000 by adjusting the height of the light source 2001 in the height direction.

Note that the method shown in FIG. 12 is more effective when the light beam 2042 is a parallel light beam. If the light beam 2042 is parallel light, even if the distance from the light source 2001 to the incident opening 2022 changes, the parallel light state remains unchanged. Thus, as will be described later, the method is effective when the mirror 2400 of the nozzle head 2000 has a paraboloidal shape (FIG. 10).

Practical examples of the rotationally symmetrical mirror (light beam direction changing optical system) 2400 will be described as Examples 1 and 2 of the second embodiment.

<Application of Spheroidal Mirror Surface> . . .
Example 1 of Second Embodiment A practical application example of the rotationally symmetrical mirror (light beam direction changing optical system) 2400 according to the second embodiment shown in FIG. 7 will be described with reference to FIGS. 8 to 10.

Figure 7:
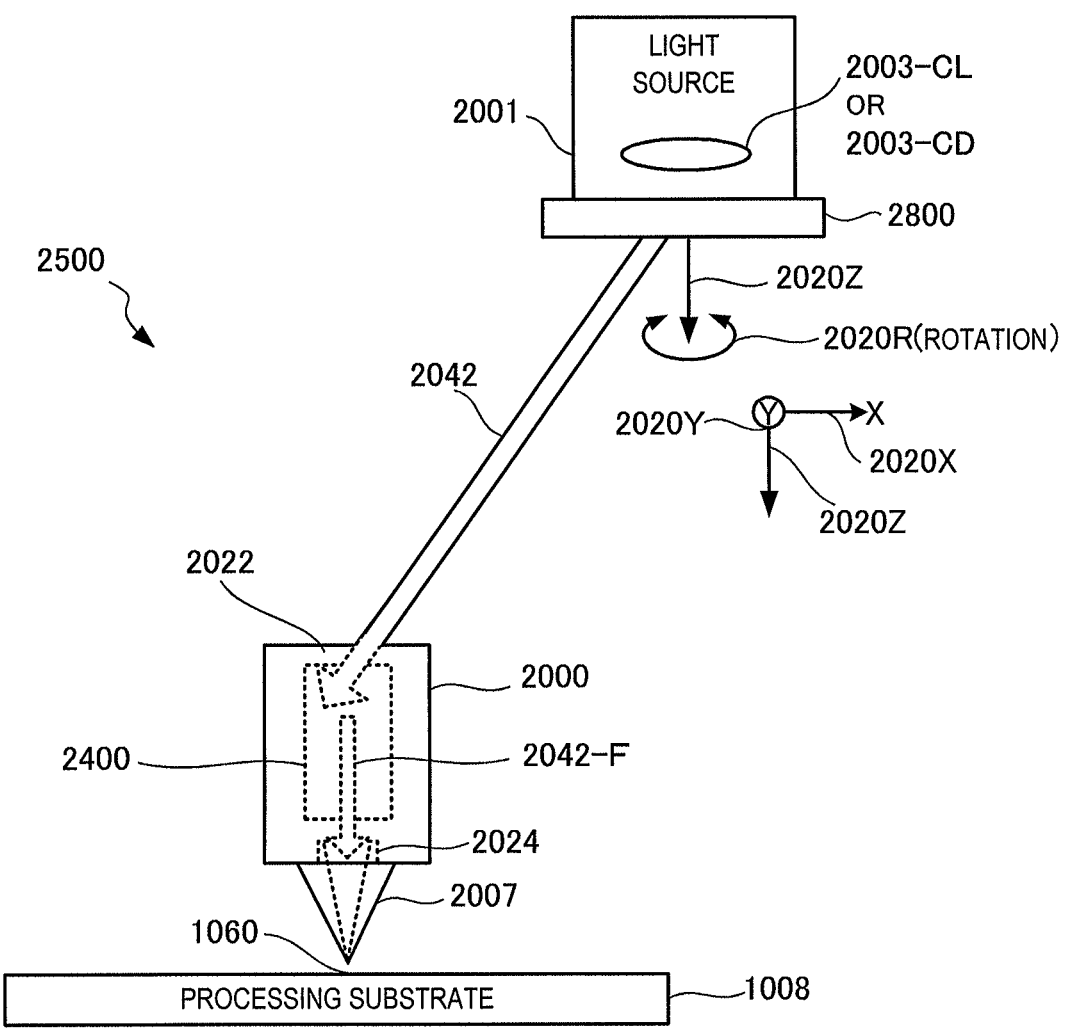
FIG. 7 is a view schematically showing the arrangement of an optical processing apparatus 2500 according to the second embodiment of the present invention wherein the optical processing apparatus according to the second embodiment is related to improvement of the light beam direction changing optical system according to the first embodiment, and especially shows a rotationally symmetrical mirror 2400 in which the functions of a direction changing mirror and condenser mirror according to the first embodiment are integrated.
Figure 8:
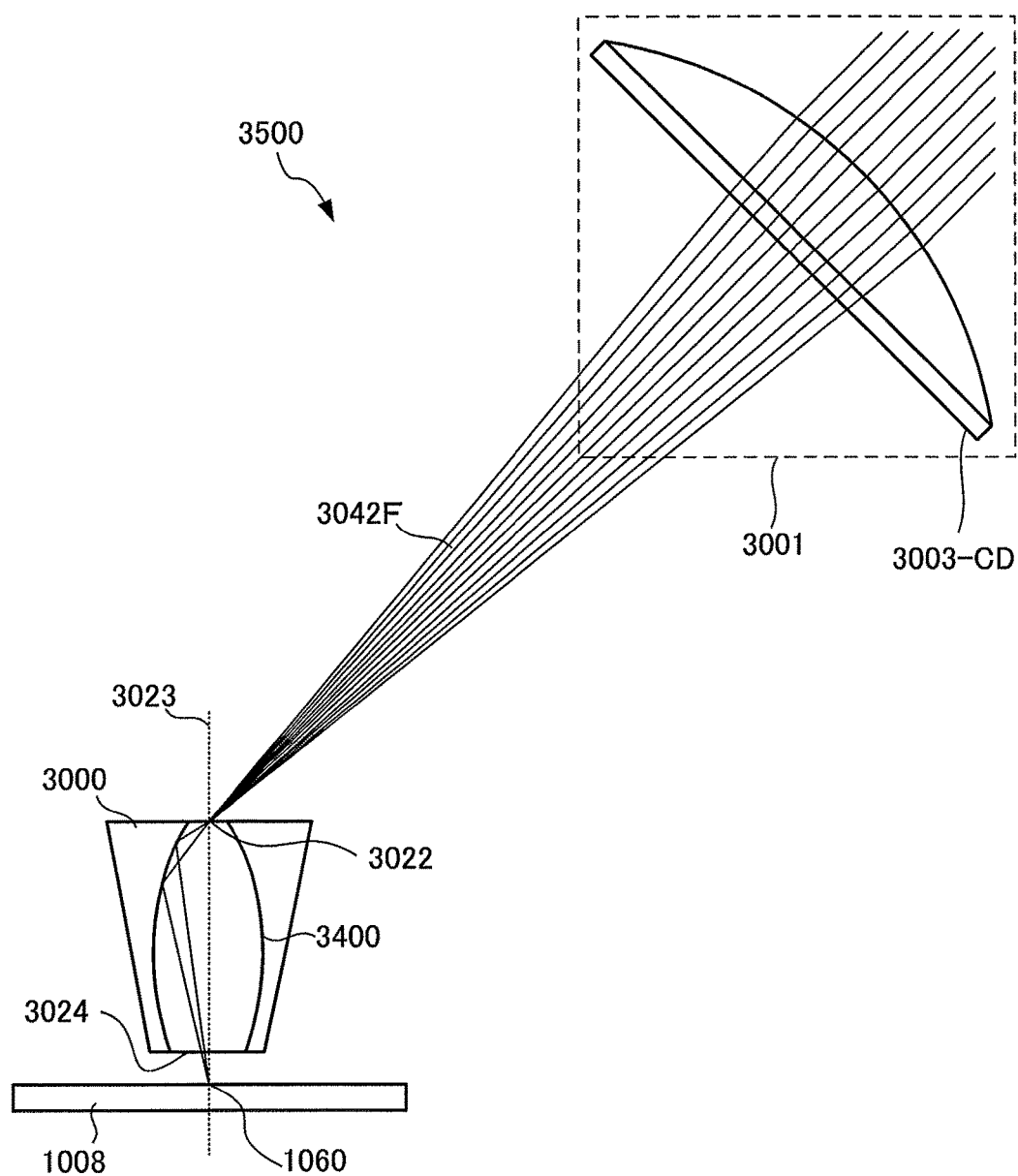
FIG. 8 is a view showing an arrangement according to Example 1 of the second embodiment wherein the rotationally symmetrical mirror 2400 according to the second embodiment of the present invention is implemented by a mirror 3400 having a spheroidal mirror surface.
Figure 9:
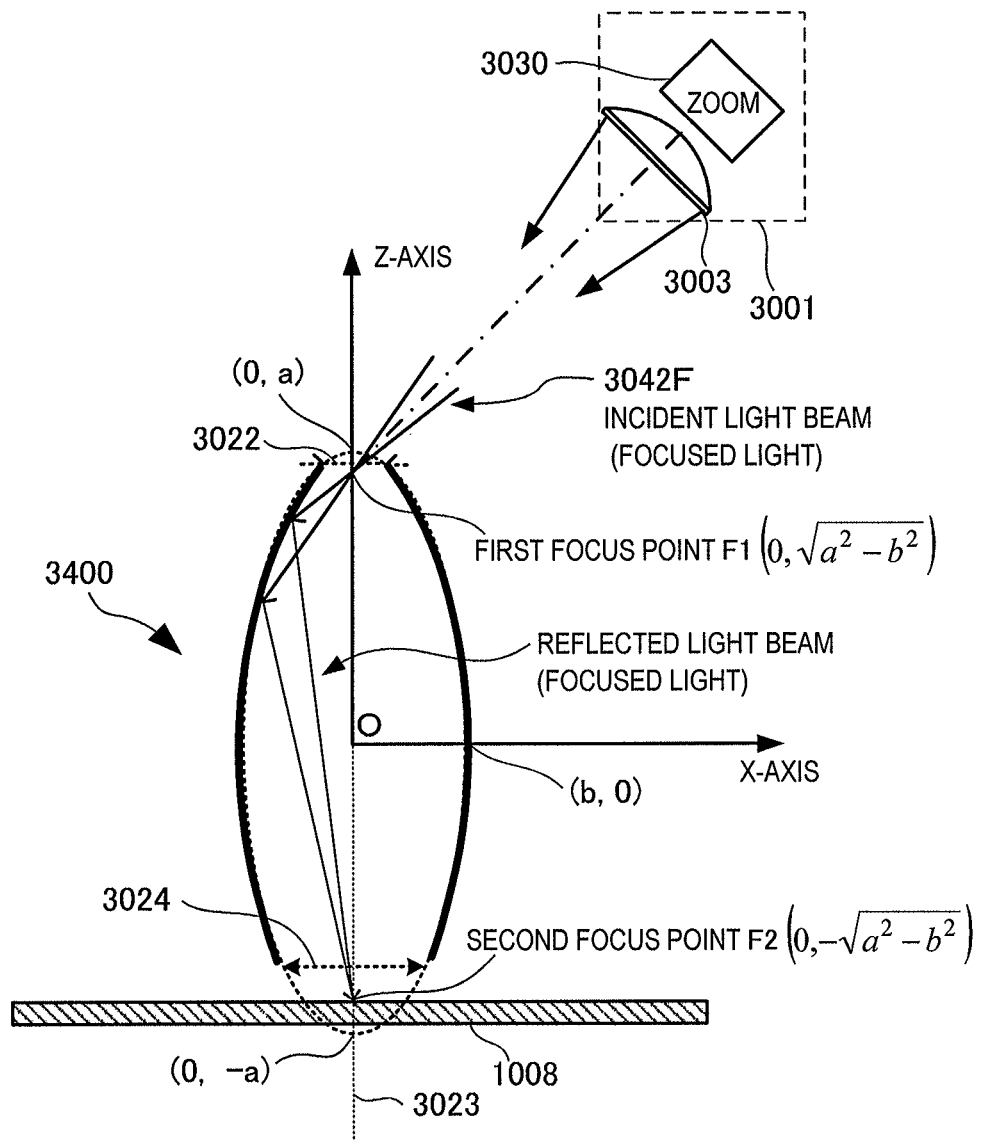
FIG. 9 is a view for explaining the arrangement of the spheroidal mirror surface 3400 according to Example 1 of the second embodiment.
Figure 10:
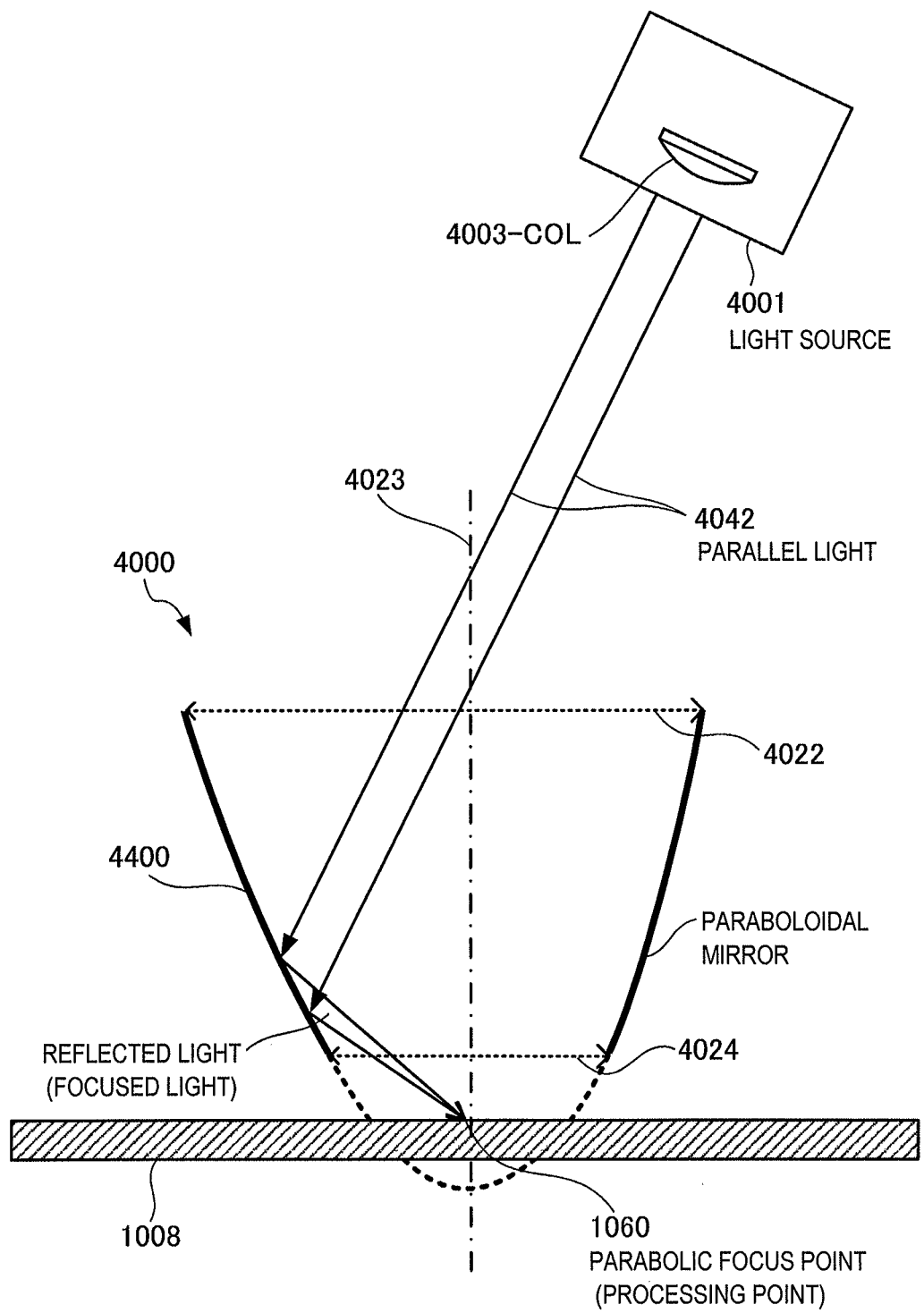
FIG. 10 is a view showing an arrangement according to Example 2 wherein the rotationally symmetrical mirror 2400 according to the second embodiment of the present invention is implemented by a mirror 4400 having a paraboloidal mirror surface, and a light beam from a light source is preferably a parallel light beam in an optical processing apparatus using the paraboloidal mirror according to Example 2 of the second embodiment.

With respect to reference numerals of components shown in FIGS. 8 to 10, components of Example 2 denoted by reference numerals whose last three digits are equal to those of reference numerals in FIG. 7 are the same or same kinds of components as those of the second embodiment adopting the rotationally symmetrical mirror 2400 (FIG. 7) as a superordinate concept.

FIG. 8 is an internal sectional view showing a nozzle head 3000 provided in an optical processing apparatus 3500 according to Example 1. A light beam changing optical system is formed in the nozzle head 3000 by a rotationally symmetrical spheroidal mirror (to be referred to as a spheroidal mirror hereinafter) 3400, more specifically, a mirror surface having a spheroidal surface shape.

The nozzle head 3000 includes an incident opening 3022 and an exit opening 3024. A mirror surface is formed on the inner surface of the spheroidal mirror 3400 continuously from the incident opening 3022. The mirror surface of the spheroidal mirror 3400 continues up to the exit opening 3024 of the nozzle head 3000.

Note that if the light beam direction changing optical system is not rotationally symmetrical and has no rotation-symmetry axis, a central axis 3023 is an axis having, as a positive direction, a direction from the incident opening 3022 to the exit opening 3024.

FIG. 9 is a view for explaining the geometry when the mirror surface 3400 of the spheroidal mirror 3400 is a spheroidal mirror surface.

In general, a spheroid has two focus points F1 and F2. If the central axis 3023 of the ellipsoid is made coincident with the Z-axis of the scanning moving mechanism according to the second embodiment, the major axis and minor axis of the ellipse are respectively represented by a and b, and a center O of the ellipsoid is set as the origin of the XYZ coordinate system, the coordinate values (X, Z) of the focus points F1 and F2 are given by:

$$F_1: (0, \sqrt{a^2-b^2})$$

$$F_2: (0, -\sqrt{a^2-b^2}) \quad (4)$$

As a property of the ellipse, an angle formed by a wall surface at an arbitrary position of the ellipsoid and a line segment connecting one (for example, F1) of the focus points to the wall surface is equal to that formed by the same wall surface and a line segment connecting the other focus point (for example, F2) to the wall surface. That is, if a light beam entering one focus point (F1) of the ellipsoid impinges on the wall surface of the ellipsoid and is reflected, the reflected light beam passes through the other focus point (F2).

Thus, if a condensed light beam from a light source 3001 is condensed at the first focus point (F1 in FIG. 9) of the spheroidal mirror 3400, that is, a condensed light beam 3042F is made to enter the first focus point F1 by arranging a condenser lens 3003 so that the focus position of the condenser lens 3003 of the light source 3001 coincides with the first focus point of the spheroidal mirror 3400, that is, all the light rays of the processing light beam 3042F from the condenser lens 3003 are made to enter the first focus point F1, all the light rays are focused at the second focus point (F2) of the spheroidal mirror 3400. If the second focus position (F2) is set as a processing point 3060, the light beam energy concentrates at the processing point 1060, thereby implementing melting processing.

The ellipsoid is rotationally symmetrical around the central axis 3023. Therefore, even if the light source 3001 rotates about the central axis 3023 by an arbitrary angle with respect to the arrangement shown in FIG. 8, the incident light beam 3042F enters a point on the ellipsoidal mirror surface shown in FIG. 8 or 9, and is reflected and condensed at the second focus point F2.

The light beam 3042F emitted from the light source 3001 reaches the incident opening portion 3022 of the spheroidal mirror 3400 by rotating, by the azimuth α, using the turret table 2800 shown in FIG. 11, the light source 3001 of the optical processing apparatus 3500 shown in FIG. 8 according to Example 1 (second embodiment) using the spheroidal mirror 3400. That is, the rotation symmetry of the spheroidal mirror 3400 of the nozzle head 3000 can be utilized to adjust a shift of the nozzle head 3000 in the azimuth direction. If the ellipsoid of the spheroidal mirror 3400 has no symmetry in the azimuth direction, even if the method shown in FIG. 11 is used to rotate the light source 3001 by the angle Δα, the incident opening portion 3022 can be captured. However, the focus point, on the processing substrate, of the light reflected by the spheroidal mirror 3400 may shift from the focus point before movement. Since the spheroidal mirror 3400 is rotationally symmetrical, when the X and Y coordinate values (X0, Y0) on the scanning mechanism of the processing point 1060 before movement move to (X1, Y1), the second focus point F2 of the spheroidal mirror 3400 does not shift before and after movement, thereby ensuring accurate optical processing.

Furthermore, if movement of the nozzle head 3000 on the X-Y plane changes a distance D in the distance direction between the incident opening 3022 and the light source 3001 (D1≠D0), adjustment (adjustment of AZ) in the height direction (Z-axis direction) of the light source, which has been explained with reference to FIG. 12, is also applied.

That is, the rotationally symmetrical mirror 2400 as a practical example of the light beam direction changing optical system 2400 according to the second embodiment described with reference to FIG. 7 is rotationally symmetrical around the central axis of the ellipsoid. Therefore, the followability of the light source light beam, which is obtained by the nozzle head 2000 shown in FIG. 7, with respect to a change in position of the nozzle head 2000 caused by movement of the nozzle head 2000 within the X-Y plane is maintained.

<Modification of Light Source Height Adjustment>

FIGS. 8 and 11 show a case in which the irradiation direction is set to the incident opening 2022 or the position of the incident opening 2022 by adjusting the light beam irradiation direction of the light source 2001 or 3001 by the angle Δα using the symmetry in the azimuth direction as a property of the mirror surface of the spheroidal mirror 3400 or the paraboloidal mirror (to be described later) 4400 to prevent the light beam emitted from the light source 2001 or 3001 from entering outside the incident opening (2022 or 3022) of the nozzle head 2000 or 3000 due to movement of the nozzle head 2000 or 3000. The "symmetry in the azimuth direction" of the spheroidal mirror 3400 or paraboloidal mirror 4400 indicates that when, with respect to an incident light beam passing through a given point (for example, the first focus point F1 of the ellipsoid) on the rotation-symmetry axis of the spheroid or paraboloid, the elevation angle of the incident light beam when seen from the given point is constant, the reflection angle of the incident light beam from an arbitrary azimuth direction by the mirror surface is the same.

On the other hand, as another property of the ellipsoid, since the incident light beam passing through the first focus point passes through the second focus point regardless of the elevation angle of the incident light beam, that is, the incident light beam from the light source 3001 is a condensed light beam, if the focus position of the light source 3001 coincides with the position of the first focus point of the spheroidal mirror 3400, an image appearing at the focus position F1 is that of the emitter of the light source 3001. Therefore, an image of the emitter, which has been formed in focus at the position of the first focus point F1 is formed at the second focus point F2 even if the elevation angle of the incident light beam changes. That is, a focus image of the emitter appears at the second focus position (the processing point 1060) by the spheroidal mirror 3400, and thus the temperature rises, thereby enabling melting processing.

Figure 13:
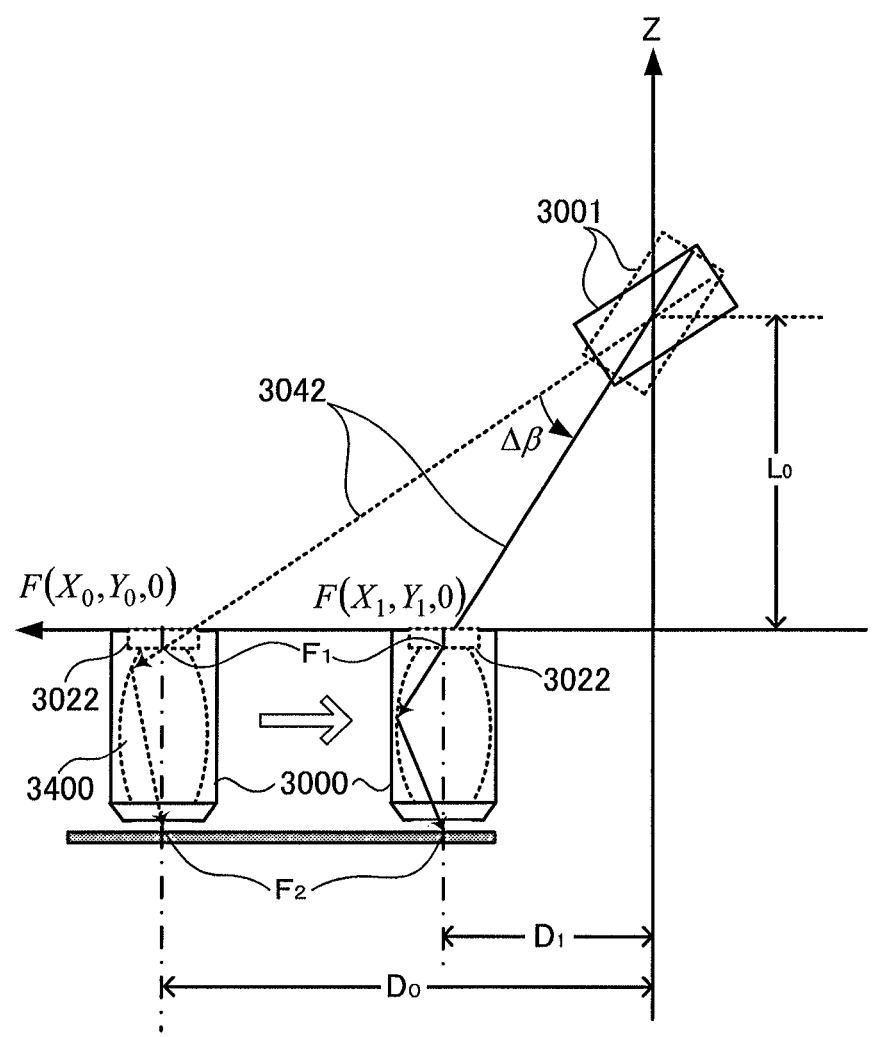
FIG. 13 is a view for explaining a principle of controlling the focal length of the condensing optical system of a light source 3001, which is generated when the incident light beam follows the incident opening 3022 if the distance from the light source to the nozzle head changes due to movement of a nozzle head 3000 in an optical processing apparatus 3500 according to Example 1 of the second embodiment wherein the light source is arranged on the obliquely upper side.

In other words, in FIG. 13, when 13 represents the elevation angle of the emitted light beam of the light source 3001, even if the nozzle head arbitrarily moves by (ΔX, ΔY) within the X-Y plane, the spheroidal mirror 3400 is used to adjust the angle to obtain the adjusted angle Δβ of the tilt angle β of the light source 3001, given by:

$$\Delta \beta = \tan^{-1} \frac{D_0}{L_0} - \tan^{-1} \frac{D_1}{L_0} \quad (5)$$

$$D_0 = \sqrt{X_0^2 - Y_0^2}$$

$$D_1 = \sqrt{X_1^2 - y_1^2}$$

Then, even if the position of the nozzle head 3000 moves from (X0, Y0) to (X0+ΔZ, Y0+ΔY), if the elevation angle of the light source 3001 is adjusted by an angle of Δβ in accordance with equation (5), the image of the emitter of the light source 3001 is focused and formed at the position of the first focus point F1 of the spheroidal mirror 3400 by the condenser lens 3003, the emitter image is reflected by the wall surface of the spheroidal mirror 3400, and the reflected image is formed at the second focus point F2 of the spheroidal mirror 3400. As a result, the density of light energy at the processing point 1060 is maximized, thereby implementing efficient optical processing.

Note that to correct the tilt angle shown in FIG. 13 according to Example 2, it is necessary to set the focus image of the condensed light beam from the light source 3001 at the first focus point of the spheroidal mirror 3400. To do this, it is necessary to adjust the focal length of the condenser lens 3003 to be equal to the distance D1 from the light source 3001 to the first focus point of the spheroidal mirror 3400 after movement. This correction is performed using a zoom actuator 3030.

Consequently, with the spheroidal mirror 3400 according to Example 1 of the second embodiment, even if the nozzle head 3000 moves, optical processing can be performed by correcting the tilt angle of the light source 3001 in accordance with the moving amount (ΔX, ΔY) in accordance with the method shown in FIG. 13. In other words, optimum azimuth correction, focal length correction, and tilt angle correction can be simultaneously implemented in accordance with movement of the nozzle head 3000.

Example 2 of Second Embodiment

A rotating curved surface according to the second embodiment is not limited to the ellipsoid described in Example 1. For example, if the curved surface of a mirror surface is a paraboloid, as shown in FIG. 10, it is possible to make a processing point 1060 coincident with a focal point F of the paraboloid.

Note that a light beam emitted from a light source 4001 to a paraboloidal mirror 4400 shown in FIG. 10 is a parallel light beam 4042. This is because the property that an image of the emitter of the light source 4001 of the parallel light beam 4042 is formed at the focus point of the paraboloid when the parallel light beam 4042 enters the paraboloidal mirror 4400 is used.

FIG. 10 shows an arrangement according to Example 2 of the paraboloid. On the mirror surface of the paraboloidal mirror 440, it is necessary to form an exit opening portion 4024 on a mirror wall surface near the focus point of the paraboloid, similarly to the spheroid. A side of the paraboloid opposite to the focus point opens to the outside, unlike the spheroid. Therefore, the incident light beam enters an open incident opening portion 4022. In this case, the incident light beam 4042 needs to be a parallel light beam. If the incident light beam is a parallel light beam, all the reflected light rays concentrate at the focus point of the paraboloid. This condenses the parallel light beam at the condensing point 1060.

Note that it is necessary to correct the azimuth (a) of the light source (FIG. 11) and the height of the light source (FIG. 12) for the paraboloidal mirror 4400, similarly to the spheroidal mirror 3400. In Example 2, however, focal length correction for focusing shown in FIG. 13 is unnecessary to use the parallel light beam.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. An optical processing apparatus for scanning a processing region having at least one-dimensional spread by moving a nozzle head while irradiating the processing region with an optical processing light beam via the nozzle head, comprising:
   a light source that emits, to an open space, the optical processing light beam toward the nozzle head;
   a nozzle head that includes a hollow nozzle and a light beam direction changing optical system which receives the light beam emitted from said light source and propagated in the open space, and changes a propagation direction of the received light beam to a direction of the processing region in the processing region, wherein said light beam direction changing optical system comprises a rotationally symmetric mirror having a rotation-symmetry axis and a mirror surface as an inner surface;

a main scanning direction moving mechanism that moves said nozzle head in a main scanning direction of the processing region; and a pivoting unit that causes a light beam emission direction of said light source to pivot around the rotation axis so that the light beam emission direction of said light source faces said light beam direction changing optical system, in accordance with movement of said nozzle head.

2. The optical processing apparatus according to claim 1, wherein the processing region includes a two-dimensional region, said optical processing apparatus further comprises a sub-scanning direction moving mechanism that moves said nozzle head in a sub-scanning direction intersecting the main scanning direction, and the processing region is processed within a two-dimensional plane formed by the main scanning direction and the sub-scanning direction.

3. The optical processing apparatus according to claim 2, wherein said light source includes an intra-light source condensing optical system whose focal length is variable, and emits a condensed light beam.

4. The optical processing apparatus according to claim 2, wherein said light source emits a parallel light beam.

5. The optical processing apparatus according to claim 4, wherein said light beam direction changing optical system of said nozzle head includes a planar mirror, normal to which is inclined by an angle of 45° with respect to the main scanning direction, that reflects the parallel light beam from said light source to change the propagation direction of the parallel light beam to the direction of the processing region, and an intra-nozzle head condensing optical system that condenses, at a processing point on the processing region, the parallel light beam whose direction has been changed to the direction of the processing region by said planar mirror.

6. The optical processing apparatus according to claim 5, wherein said light source emits a parallel light beam parallel to the sub-scanning direction, said optical processing apparatus further comprises said main scanning direction moving mechanism, said sub-scanning direction moving mechanism, and a light beam direction changing mirror that is provided in said sub-scanning direction moving mechanism, and reflects the parallel light beam emitted from said light source in the sub-scanning direction and guides the parallel light beam in the main scanning direction, and said planar mirror receives the parallel light beam propagating in the main scanning direction, and changes a traveling direction to the direction of the processing region.

7. The optical processing apparatus according to claim 6, wherein said optical processing apparatus can parallelly process the processing region by n nozzle heads, and comprises n main scanning direction moving mechanisms that respectively scan and move the n nozzle heads in n main scanning directions parallel to each other, n first light beam direction changing optical systems that are respectively fixed to said n main scanning direction moving mechanisms, and said sub-scanning direction moving mechanism, and said sub-scanning direction moving mechanism comprises a sub-scanning direction guide rail, n sliders that can freely move on said guide rail and respectively move said n main scanning direction moving mechanisms in the sub-scanning direction, and n second light beam direction changing optical systems that are respectively provided on said n sliders and guide the light beam from said light source to light beam direction changing optical systems of the respective nozzle heads.

8. The multi-head optical processing apparatus according to claim 7, wherein said n second optical systems comprise n half mirrors, transmittances of said n half mirrors are set so that the transmittance decreases from a half mirror near said light source, and a last half mirror comprises a total reflection mirror with a transmittance of 0% (a reflectance of 100%).

9. The multi-head optical processing apparatus according to claim 8, wherein by setting, to $\{1/(n-m+1)\} \times 100\%$, a reflectance of an mth half mirror among (n−2) half mirrors of relaying optical systems obtained by excluding said half mirror near said light source and said last half mirror from said n half mirrors, a light amount of a light beam supplied to each of said n nozzle heads is constant.

10. The optical processing apparatus according to claim 1, wherein said nozzle head includes, in a separate direction from the processing point along the rotation-symmetry axis of said rotationally symmetric mirror, an incident opening portion where the light beam from said light source is received.

11. The optical processing apparatus according to claim 10, wherein said light source is arranged in a separate direction from the processing point with respect to said incident opening portion so that the light beam from said light source enters from said incident opening portion and is reflected by the wall surface of said rotationally symmetric mirror.

12. The optical processing apparatus according to claim 1, wherein said rotationally symmetric mirror comprises a spheroidal mirror having a major axis in a direction of the rotation-symmetry axis, and said light source is arranged so that a focus position of a condensed light beam emitted toward said nozzle head coincides with a first focus position of said spheroidal mirror and a light beam which has passed through the first focus position, and has entered and been reflected by one of wall surfaces of said spheroidal mirror is condensed at a second focus point of said spheroidal mirror.

13. The optical processing apparatus according to claim 12, wherein a focus position of said intra-light source condensing optical system of said light source coincides with the first focus position of said spheroidal mirror.

14. The optical processing apparatus according to claim 1, wherein said rotationally symmetrical mirror comprises a paraboloidal mirror in which a focus point and a vertex are aligned on a rotation-symmetry axis and an inner surface comprises a mirror surface, and the focus point of said rotationally symmetrical mirror coincides with the processing point.

15. A shaping apparatus for performing laminating and shaping, including an optical processing apparatus defined in claim 1, wherein
  a nozzle head sucks a powder material, and ejects the sucked powder material toward a processing point.

16. An optical processing apparatus for scanning a processing region having an at least one-dimensional spread by moving a nozzle head while irradiating the processing region with an optical processing light beam via the nozzle head, comprising:
  a light source that emits, to an open space, the optical processing light beam toward the nozzle head;
  a nozzle head that includes a hollow nozzle and a light beam direction changing optical system which receives the light beam emitted from said light source and propagated in the open space, and changes a propagation direction of the received light beam to a direction of the processing region in the processing region, wherein said light beam direction changing optical system comprises a rotationally symmetric mirror having a rotation-symmetry axis and a mirror surface as an inner surface;
  a main scanning direction moving mechanism that moves said nozzle head in a main scanning direction of the processing region; and
  an adjuster that adjusts a height of a light beam emission position of said light source without changing the emission direction of said light source so that the light beam from said light source reaches said light beam direction changing optical system of said nozzle head, in accordance with movement of said nozzle head.

17. An optical processing apparatus for scanning a processing region having an at least one-dimensional spread by moving a nozzle head while irradiating the processing region with an optical processing light beam via the nozzle head, comprising:
  a light source that emits, to an open space, the optical processing light beam toward the nozzle head;
  a nozzle head that includes a hollow nozzle and a light beam direction changing optical system which receives the light beam emitted from said light source and propagated in the open space, and changes a propagation direction of the received light beam to a direction of the processing region in the processing region, wherein said light beam direction changing optical system comprises a rotationally symmetric mirror having a rotation-symmetry axis and a mirror surface as an inner surface;
  a main scanning direction moving mechanism that moves said nozzle head in a main scanning direction of the processing region; and
  a tilt unit that tilts said light source by a predetermined angle so that the light beam from said light source reaches the incident opening position of the rotation symmetry of said nozzle head, in accordance with movement of said nozzle head.

* * * * *